United States Patent
Knapp

[15] 3,640,428
[45] Feb. 8, 1972

[54] SEED-CONTAINING PELLET-DISPENSING EQUIPMENT

[72] Inventor: Philip B. Knapp, Lynbrook, N.Y.
[73] Assignee: Aptek Industries, Inc., Lynbrook, N.Y.
[22] Filed: Sept. 4, 1969
[21] Appl. No.: 855,289

[52] U.S. Cl. ........................................................ 221/211
[51] Int. Cl. ..................................................... B23a 7/04
[58] Field of Search ............................ 221/211; 111/77

[56] References Cited

UNITED STATES PATENTS

| | | | |
|---|---|---|---|
| 2,325,665 | 8/1943 | Cox | 221/211 X |
| 2,737,314 | 3/1956 | Anderson | 221/211 X |
| 2,871,805 | 2/1959 | Behnen | 111/77 |
| 3,022,755 | 2/1962 | Roepke | 111/77 |
| 3,240,175 | 3/1966 | Clow | 111/77 |
| 3,380,626 | 4/1968 | Giannini | 111/77 X |
| 3,511,016 | 5/1970 | Craig | 221/211 X |
| 3,533,535 | 10/1970 | Knapp | 221/211 |

Primary Examiner—Samuel F. Coleman
Attorney—Arthur B. Colvin

[57] ABSTRACT

A seed-containing pellet-forming equipment for automatically removing a single seed at a time from a mass of seeds and depositing such seed into a mold cavity which previously had been loaded with a charge of pellet-forming material and after the seed is deposited onto such charge, loading a second charge of such material into the cavity and then compressing the contents of the cavity to form such pellet.

19 Claims, 36 Drawing Figures

INVENTOR.
PHILIP B. KNAPP

BY
ATTORNEY

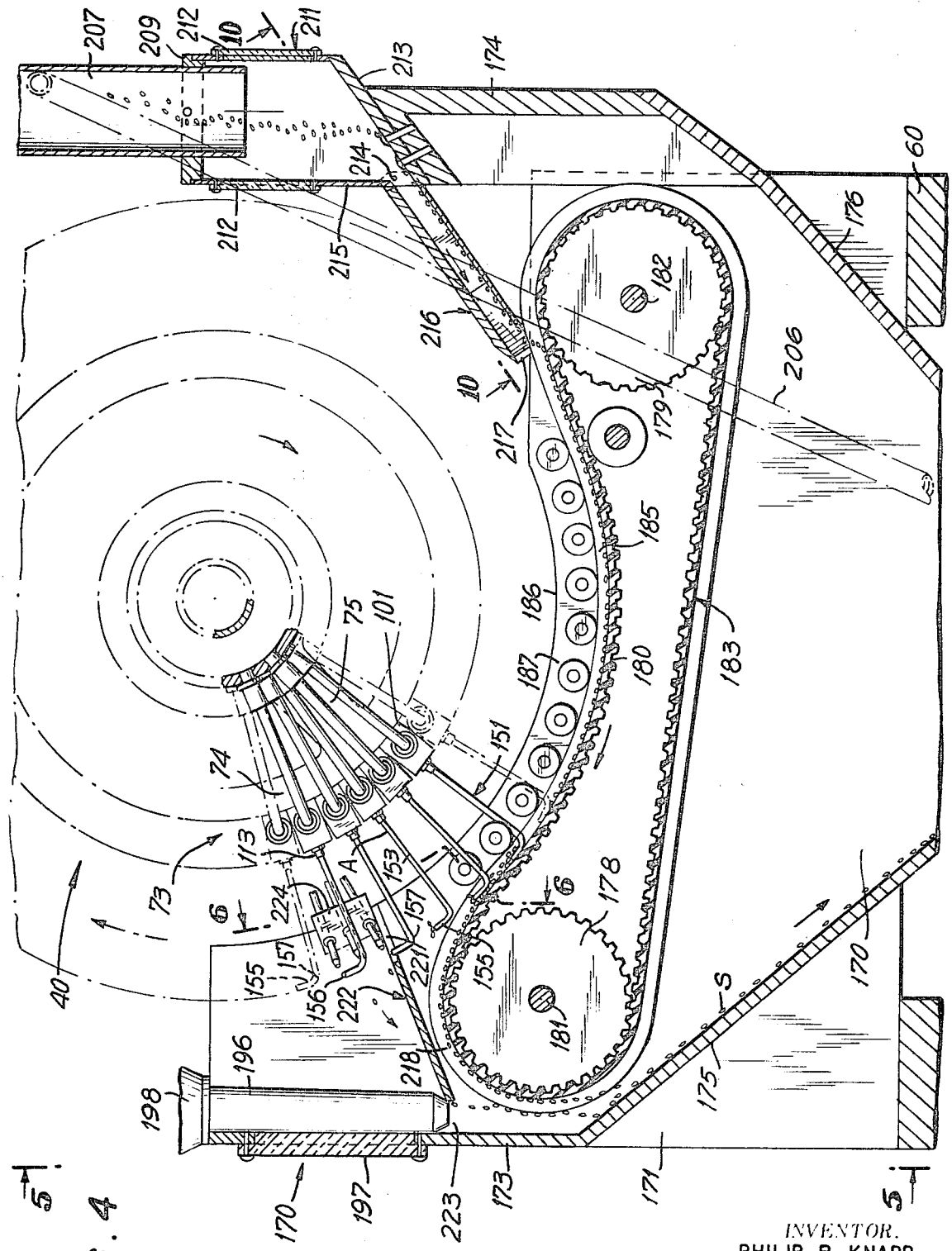

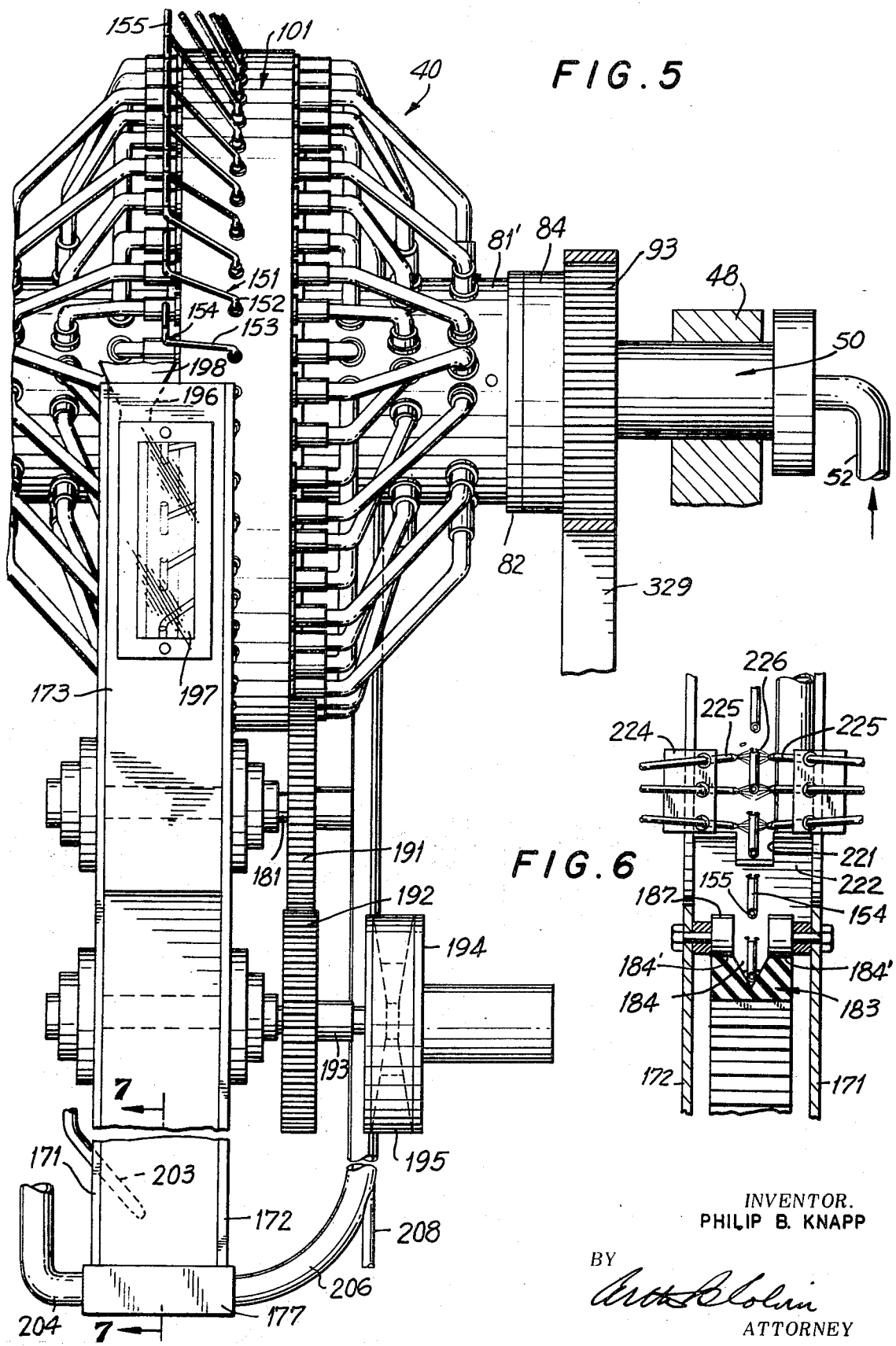

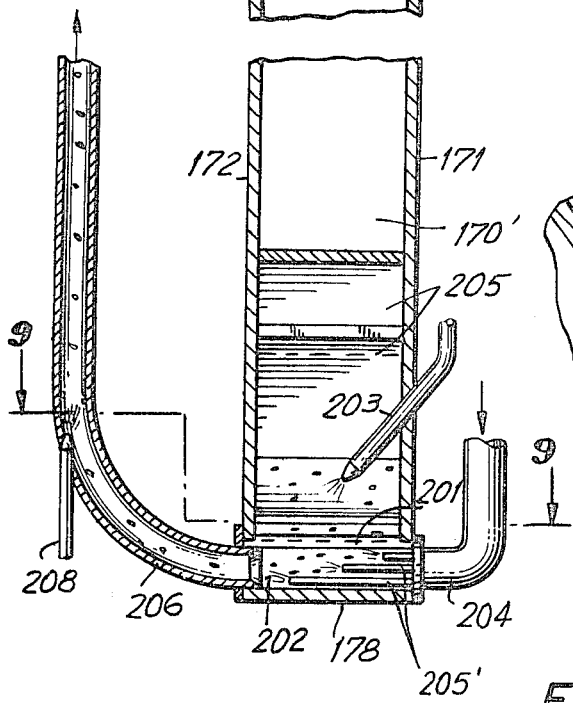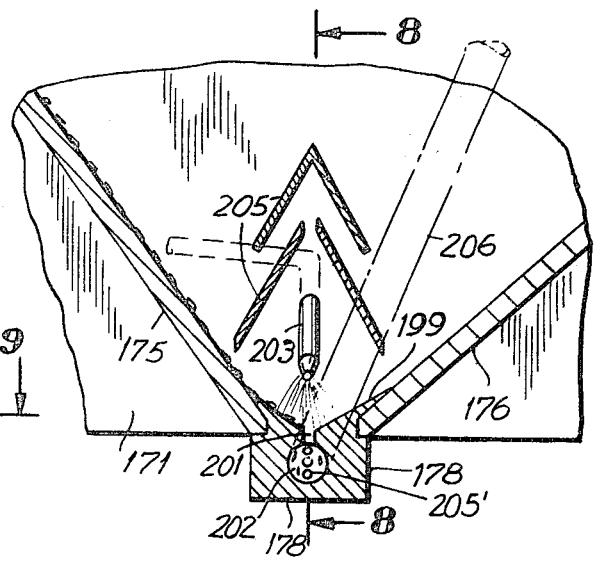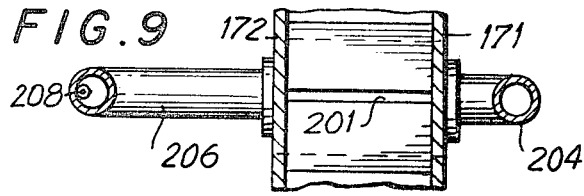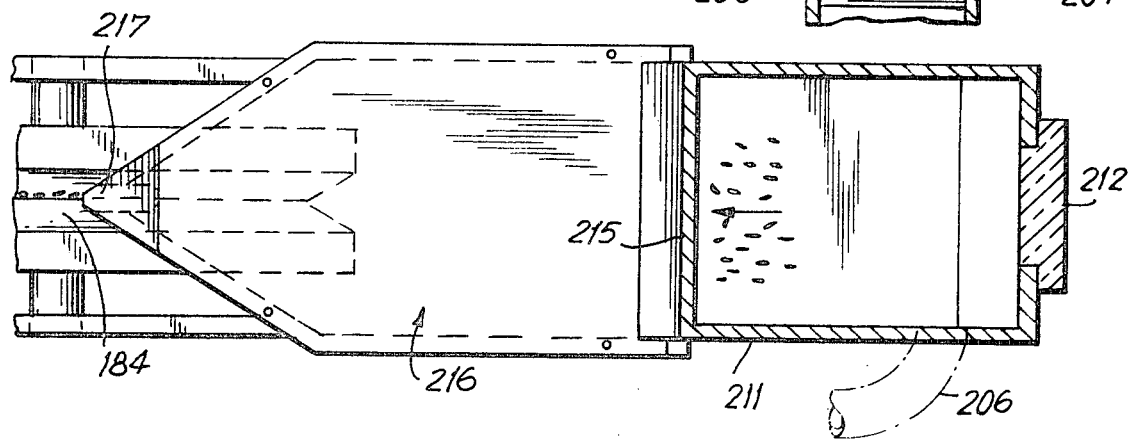

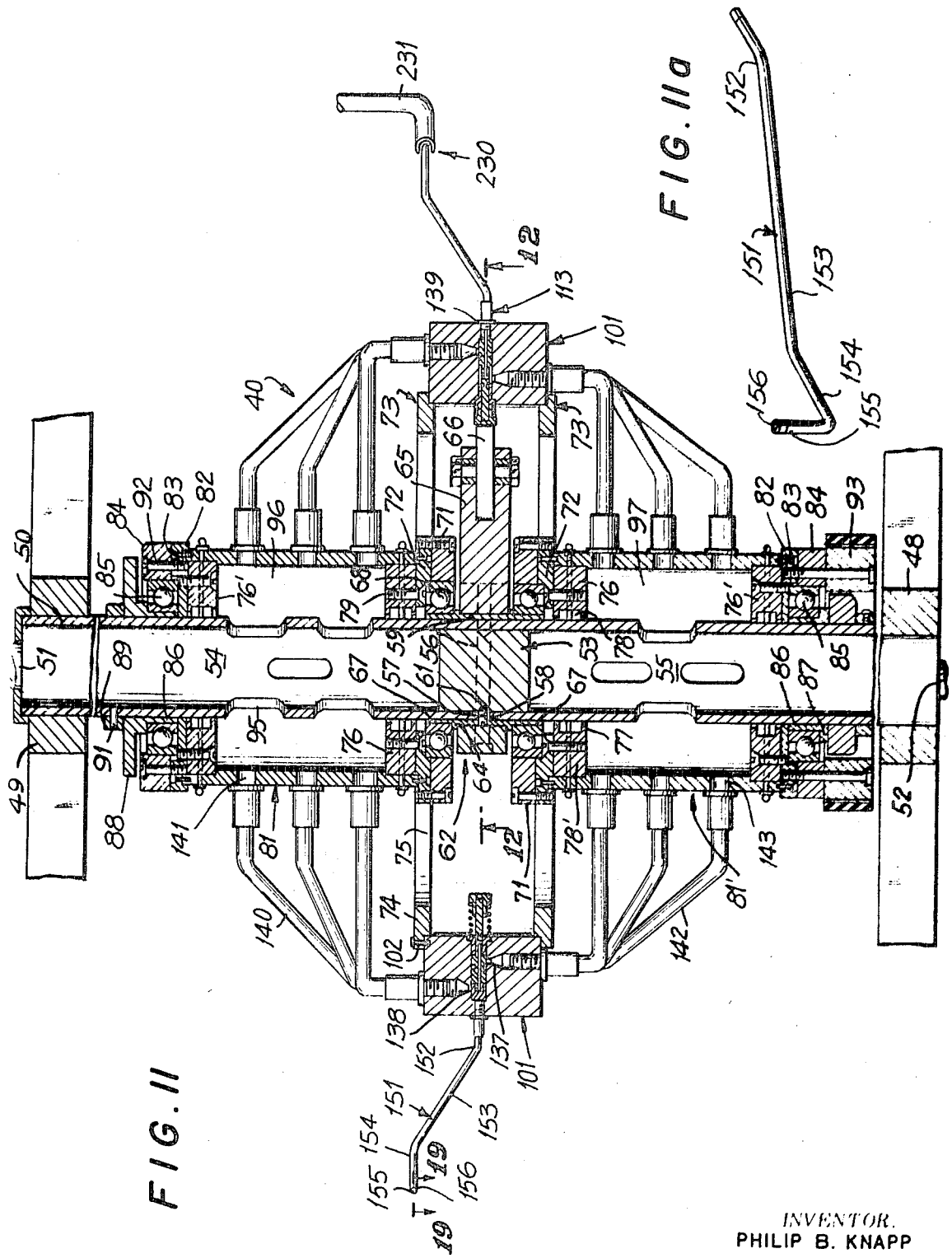

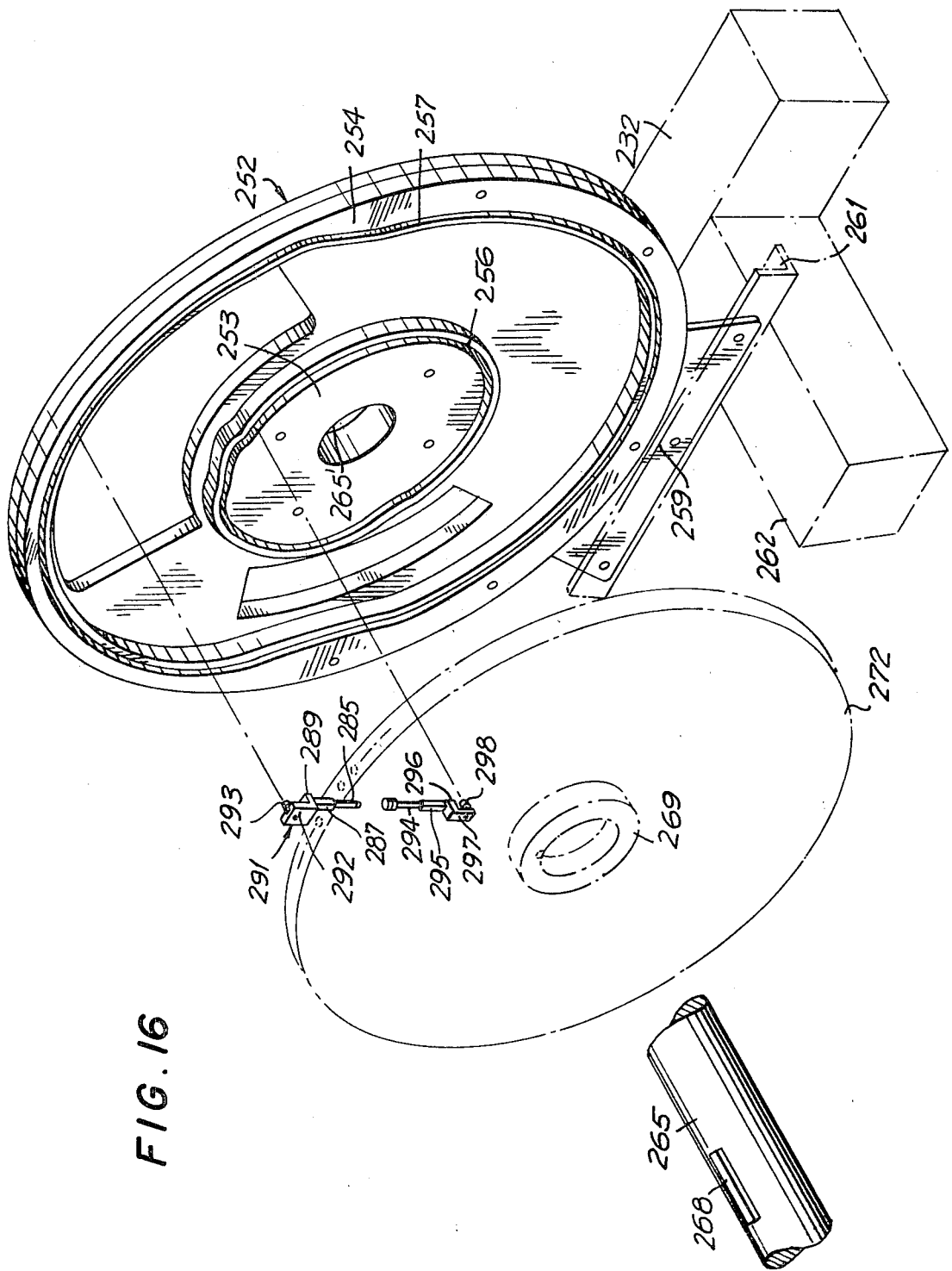

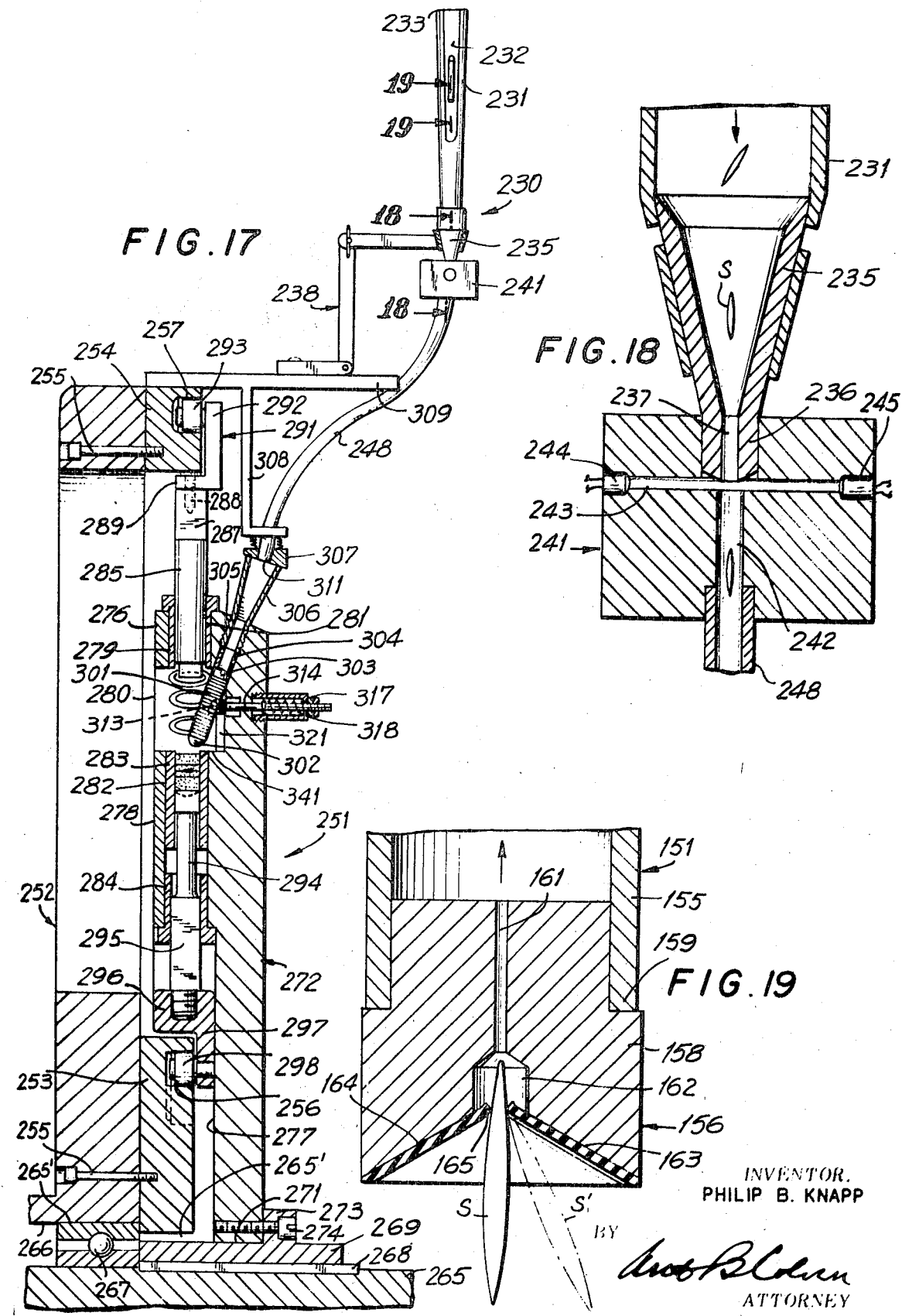

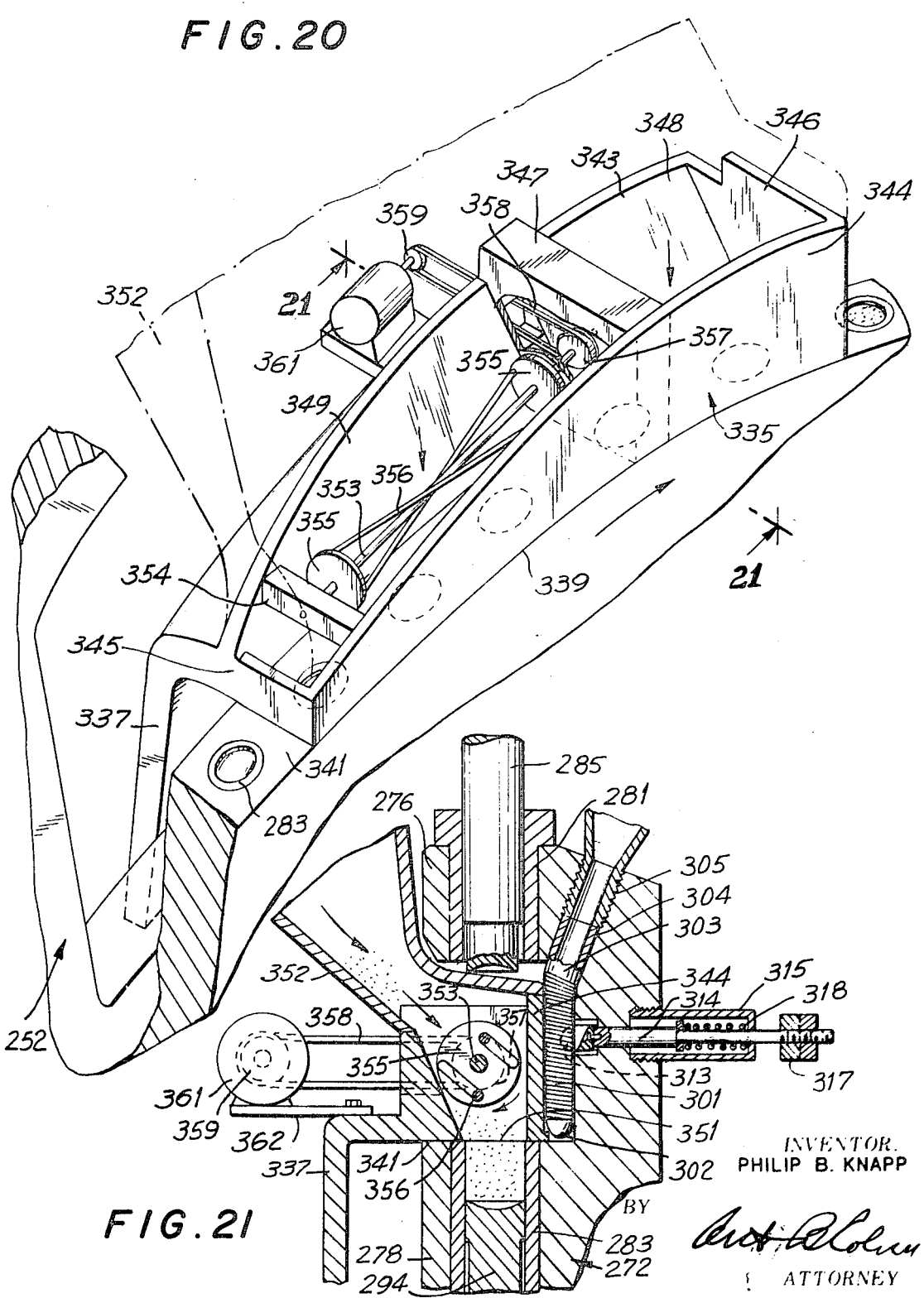

INVENTOR.
PHILIP B. KNAPP
BY
ATTORNEY

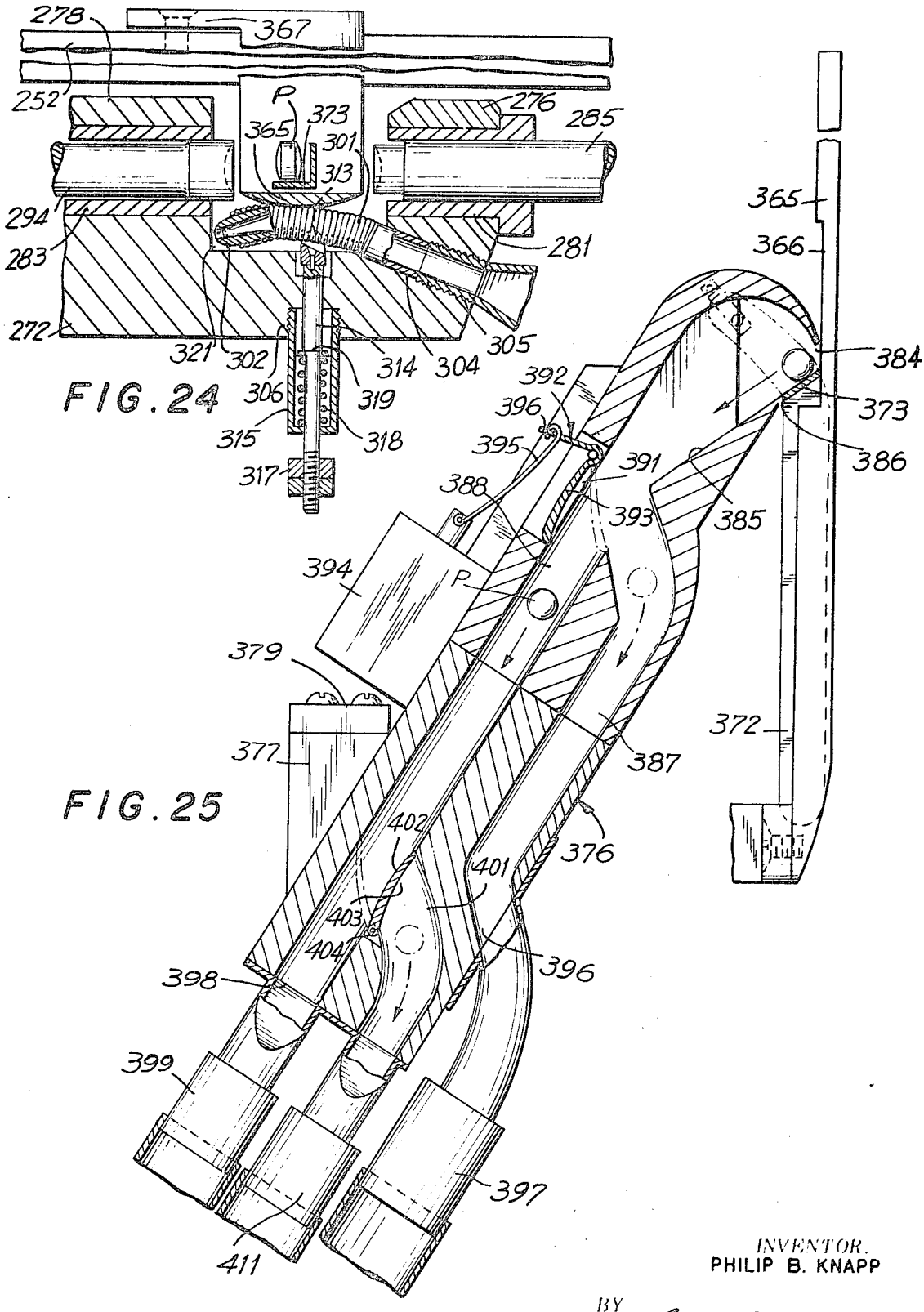

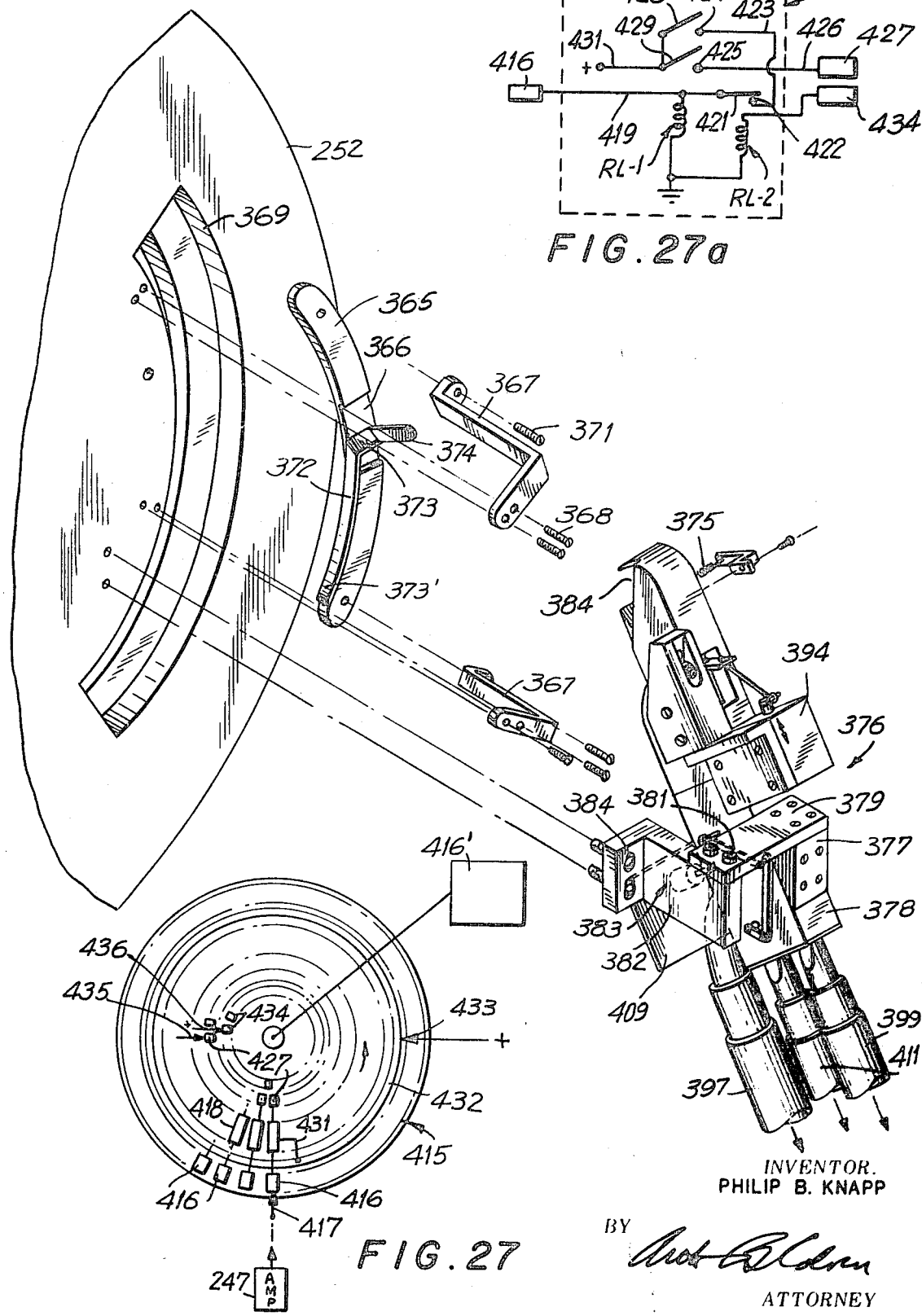

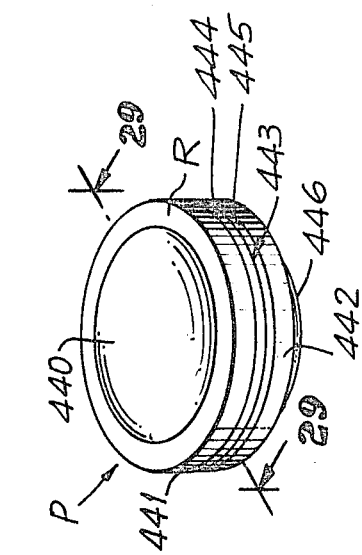
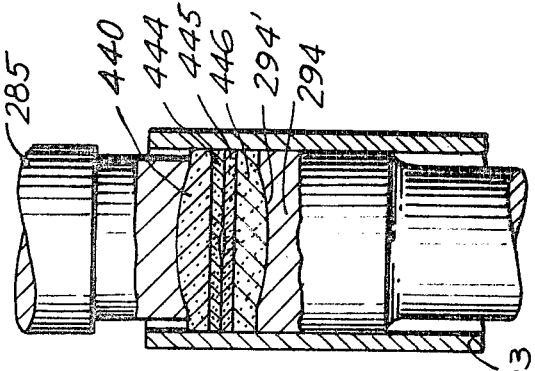
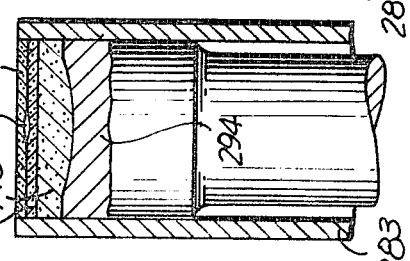
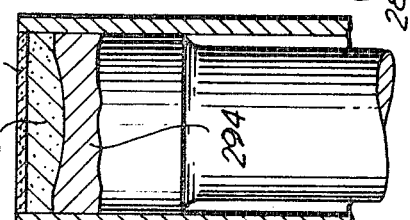
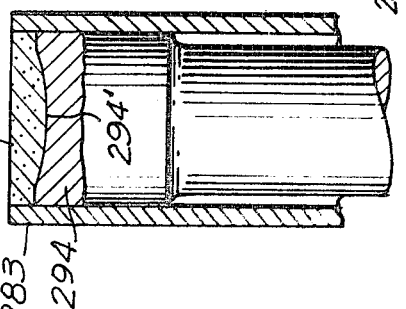

SEED-CONTAINING PELLET-DISPENSING EQUIPMENT

As conducive to an understanding of the invention, it is noted that due to the delicate nature of seeds which are planted for the growth of vegetable and flower crops and due to their small size and irregular shape, it is difficult individually to take a single seed and insert the same into a depression or cavity in the ground located at desired intervals. Moreover, where a large area is to be planted the cost of handling individual seeds would be prohibitive and commercially unfeasible.

As a result, seeds normally have been inserted into the ground either manually, or by automatic planters which will feed a plurality of seeds into each hole in the ground which is then covered. This method of planting results in the presence of several seeds in each hole with subsequent need to thin out the resultant growth promptly after emergence from the ground in order to provide desired growth conditions. This is necessary in order that each planted region only contain a desired number of seeds to insure that there will be proper nutrition given to each of the subsequent growths by reason of the nutrients contained in the ground and the water availability and in addition if several seeds have been planted in the same hole, unless the growth from all but one of the seed is removed, there normally will be a tendency for the multiplicity of growths to interfere with their proper development.

Where, to facilitate handling of the seeds, in order to permit the planting of a single seed at a time in each hole, a seed cell or pellet is provided, such as shown and described in applicant's copending U.S. Pat. application Ser. No. 781,014, which comprises a casing of suitable material encompassing the seed cell to protect the latter and permit handling thereof either manually or by automatic planting equipment so that a single seed can be planted in an individual hole, due to the delicate nature of the seed, manual handing thereof to form the pellet, unless done extremely carefully, would cause injury to the seed with resultant failure of the latter to grow.

In view of the fact that even to plant a relative small area, thousands of seed cells or pellets would have to be planted, more particularly in a typical example of lettuce seeds, a minimum of 26,000 seeds would have to be planted to an acre, it is apparent that manually to form seed cells or pellets each containing an individual seed would be so prohibitive in cost as to have no commercial value.

It is accordingly among the objects of the invention to provide an equipment for automatically forming seed cells or pellets each containing a single seed.

Another object of the invention is to provide an equipment which automatically removes one seed at a time from a mass of seeds without likelihood of injury to such seed and which will thereupon form seed cells or pellets, each containing a single seed, which equipment will operate at a relatively high rate of speed and is not likely to be deranged even after long use.

Another object of the invention is to provide an equipment of the above type in which a pellet will be formed without likelihood of excessive pressure being applied to the seed contained therein.

Still another object of the invention is to provide equipment of the above type in which accurate selection will be made between those pellets in which seeds have properly been located and those pellets in which no seeds have been placed.

SUMMARY OF THE INVENTION

According to the invention, a mass of seeds are transported by a conveyor belt while simultaneously with the movement of such belt a plurality of seed pickup devices in the form of nozzles are advanced in substantially the same path of movement as the conveyor so that the nozzles will move into the mass of seeds carried by the conveyor, the nozzles being conformed so that when suction is applied to the nozzles, each nozzle will remove a single seed from the conveyor. Thereupon, the nozzles are successively advanced to a seed discharge station where air pressure is applied to the nozzle to eject the seed carried thereby to a pellet-forming device. The pellet-forming device comprises a plurality of mold cavities moving past the discharge station, each of said cavities being adapted to receive a single seed as it is ejected from the associated nozzle. The cavities have opposed plungers associated therewith, one of which forms the floor of the cavity. As the cavities advance, means are provided successively to load the latter with a charge of material from which the bottom layer of the pellet is formed and after the seed has been deposited on such bottom layer, load the cavity with a charge of material from which the top layer of the pellet is formed. With further advance of each of the cavities, the plungers are brought together to compress the material charged into each cavity to form a pellet, the compression being greatest at the periphery of the pellet so that the seed located in the center thereof will not be subjected to excessive pressures.

According to one feature of the invention, each of the layers of material charged into the cavity to form the bottom and top layers of the pellet is itself formed from two separate and distinct materials which are successively charged into the cavity so that the pellet is actually formed from four layers. Thus, the two innermost layers in which the seed will be embedded are formed from material which provides a cushioning effect thereby further to protect the delicate seed and the two outer layers are formed from materials which promote the initial growth of the seed.

With continued movement of the cavities and the pellets formed therein, the pellets will be advanced to a discharge station where they are successively ejected from the cavities into suitable containers. Since there is a possibility that the pickup nozzles may not have properly removed a seed from the mass, so that no seed would be discharged into an associated cavity, means are provided to detect those pellets which are ejected from the pellet discharge station in which no seed had been positioned. To this end, the equipment has detection means associated with the seed discharge station which will sense whether or not a seed is being expelled into an associated cavity and through appropriate memory circuits, if no seed has been expelled, when the associated pellet reaches the pellet discharge station it will be diverted into a reject container.

In the accompanying drawings in which is shown one of various possible embodiments of the several features of the invention, FIG. 1 is a perspective view of the equipment;

FIG. 4 is a longitudinal view partly in cross section taken along line 4—4 of FIG. 2;

FIG. 5 is a fragmentary end view with parts broken away, taken along line 5—5 of FIG. 4;

FIG. 6 is a detail sectional view taken along line 6—6 of FIG. 4;

FIG. 7 is a detail sectional view taken along line 7—7 of FIG. 5;

FIG. 8 is a sectional view with parts broken away taken along line 8—8 of FIG. 7;

FIG. 9 is a sectional view taken along line 9—9 of FIG. 8;

FIG. 10 is a sectional view taken along line 10—10 of FIG. 4;

FIG. 11 is a transverse sectional view taken along line 11—11 of FIG. 2;

FIG. 11a is a perspective view of the pickup tube;

FIG. 16 is a diagrammatic perspective view of the pellet-forming mechanism;

FIG. 17 is a fragmentary sectional view taken along 17—17 of FIG. 15;

FIG. 18 is a detailed sectional view taken along line 18—18 of FIG. 17;

FIG. 19 is a fragmentary detail sectional view on a greatly enlarged scale of the pickup nozzle taken along line 19—19 of FIG. 11;

FIG. 20 is a fragmentary perspective view on an enlarged scale of the feed hopper for the pellet;

FIG. 21 is a sectional view taken along line 21—21 of FIG. 20;

FIG. 24 is a detail sectional view taken along line 24—24 of FIG. 22;

FIG. 25 is a sectional view taken along line 25—25 of FIG. 15;

FIG. 26 is a fragmentary perspective view of the pellet discharge station;

FIG. 27 and FIG. 27a are diagrammatic views of the control circuit for the pellet discharge station;

FIG. 28 is a perspective view of the pellet or seed cell made according to one embodiment of the invention;

FIG. 29 is a transverse sectional view taken along line 29—29 of FIG. 28, and

FIGS. 30a to 30e are diagrammatic views illustrating the steps in forming the pellet.

Figure 1:
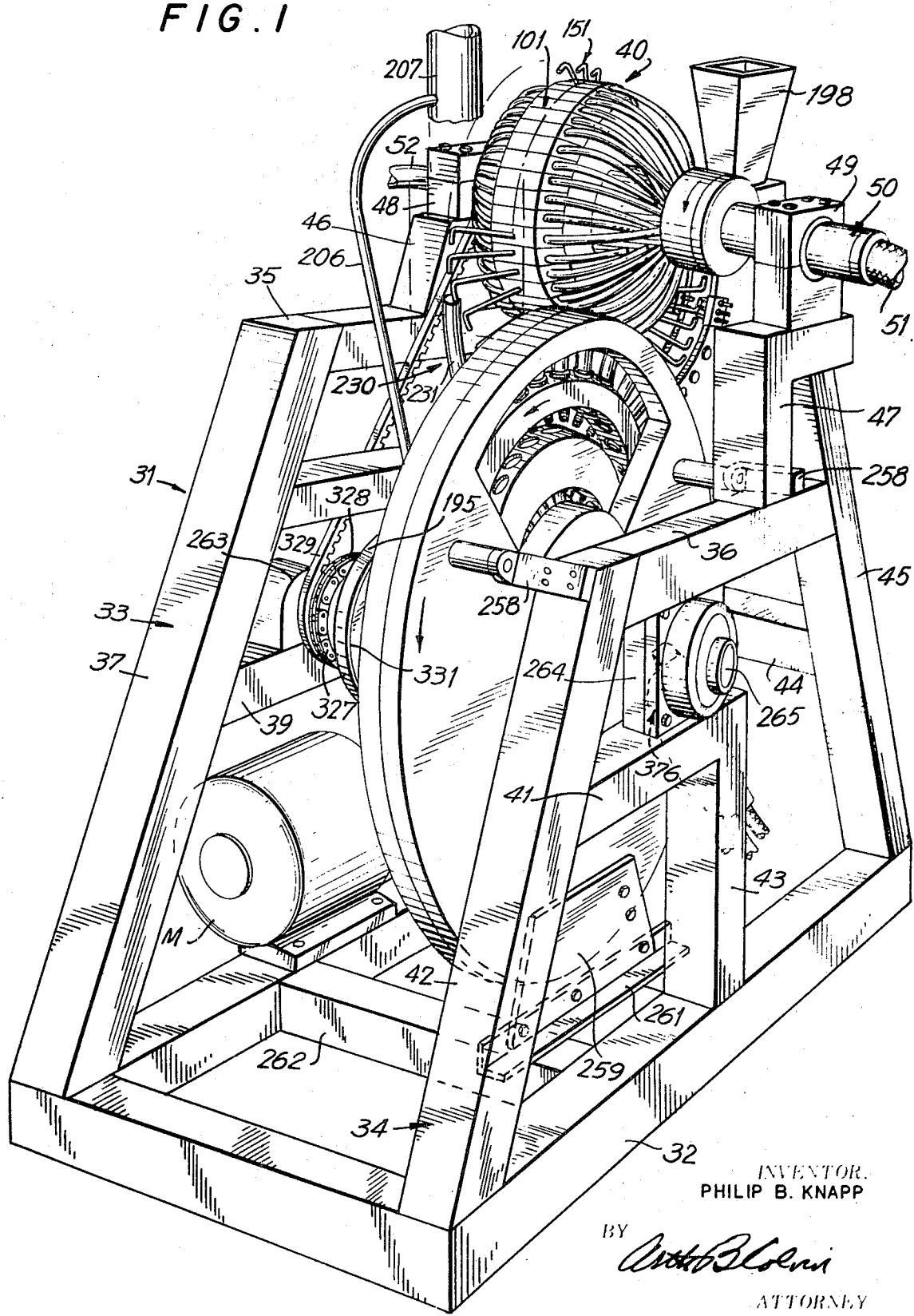
Figure 2:
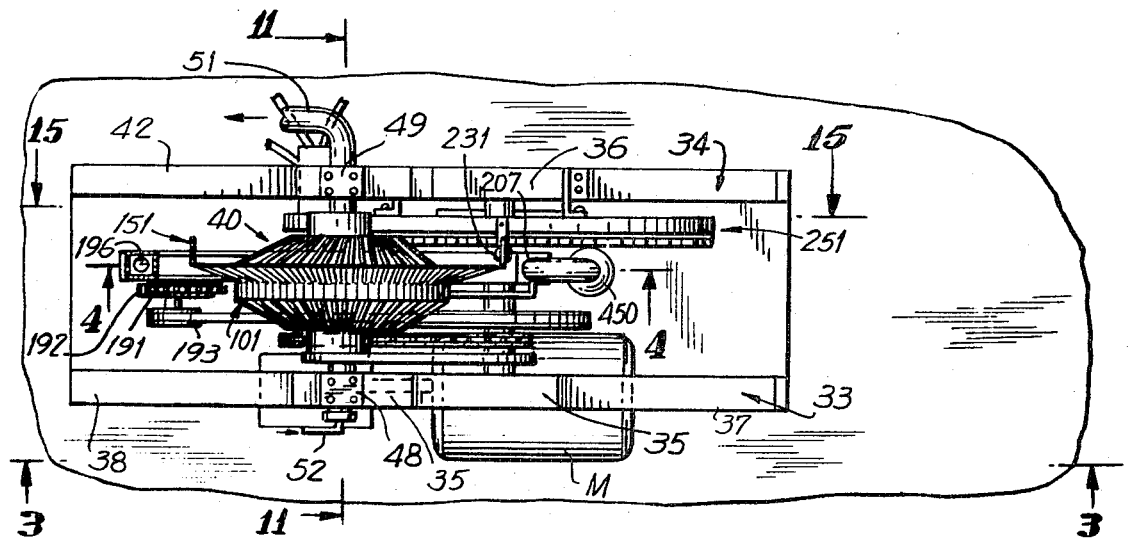
FIG. 2 is a top plan view thereof.

Referring now to the drawings, as shown in FIGS. 1 and 2, the equipment comprises a frame 31 including a substantially rectangular base or platform 32 from the sides of which rise substantially trapezoidal supports 33, 34 each defining an A-frame having horizontal top surfaces 35, 36, the former being in a higher plane than the latter.

Extending in a horizontal plane between the legs 37, 38 of support 33, is a strut 39 which lies in the same plane as a strut 41 secured at one end to one of the legs 42 of support 34 and supported at its other end by vertical strut 43 rising from base 32. A strut 44 extending transversely between the legs 38 and 45 of supports 33, 34 serves to maintain the latter in spaced parallel relationship.

The frame above described mounts the various elements of the equipment which will now be described in detail.

SEED PICKUP ASSEMBLY

In order to mount the pickup assembly 40, a pair of brackets 46, 47 (FIG. 1) are provided, rising from the top surfaces 35, 36 of each of the side supports 33, 34. Mounted on said brackets are clamp blocks 48, 49 which rigidly support a hollow shaft 50 extending transversely across the frame 31.

As shown in FIGS. 1, 2 and 11, the ends of shaft 50 extend beyond an associated clamp block 48, 49 and a vacuum or suction line 51 is connected to one end of shaft 50 and a pressure line 52 is connected to the other end of the shaft.

As shown in FIG. 11, a plug 53 is positioned in the center of shaft 50 to divide the latter into a vacuum chamber 54 and a pressure chamber 55. In order to insure that a seal is maintained between the chambers 54, 55, the plug 53 has a circumferential groove 56 in its periphery which is aligned with an opening 57 in shaft 50 and with an opening 58 in a sleeve 59 encompassing the midportion of shaft 50.

The sleeve 59 is secured to the hollow shaft 50 and to plug 53 by a setscrew 61 which locks the parts in fixed position. Before inserting the setscrew 61, a sealant is forced through aligned openings 57, 58 into groove 56 to fill the latter, effectively to form a seal between the chambers 54, 55.

Encompassing the sleeve 59 and positioned between spaced annular ribs 64, preferably formed integral with the sleeve 59, is a clamp block 62 formed from two substantially identical sections 62a and 62b. Each of the sections 62a, 62b has an arcuate recess which, when juxtaposed, form a central opening through which the sleeve 59 extends. Thus, when the sections 62a, 62b are urged together by bolts 63, they will securely clamp the sleeve 59 therebetween so that the block 62 will be retained in fixed position with respect to the hollow shaft 50.

The section 62b of block 62 has an outstanding arm 65, bifurcated at its outer end and rotatably mounting a cam roller 66, the function of which will hereinafter be described.

Referring to FIG. 11, it is to be noted that the end portions 67 of the sleeve 59 define annular supports for the inner race of bearings 68. Encompassing the outer race of each of said bearings 68 is an associated ring member 69 which is secured by a plurality of circumferentially spaced screws 71 to the hub 72 of an associated disc 73. As is clearly shown in FIGS. 4 and 11, each of the discs 73 has a peripheral rim 74 connected by a plurality of radial arms 75 to the hub 72.

Also secured to each of the discs 73 on the outer surface thereof and encompassing the hollow shaft 50 are annular members 76, each of the inner peripheries of which has an annular groove 77 in which an annular sealing member 78 is positioned. Each of the sealing members which engages the fixed shaft 50, may be lubricated through an associated passageway 78' extending substantially radially through the annular member 76. As is shown in FIG. 11, the annular members 76 are secured to the associated disc 73 by screws 79.

The annular member 76 serves as the support and closure member for one end of an associated manifold sleeve 81, 81', the other end of each sleeve being supported by an annular member 82 identical to the annular member 76.

Referring to FIG. 11, it is to be noted that an additional annular member 82 is secured to the end of each of the manifold sleeves 81 by screws 83. Secured to each of said additional annular members 82 is an annular retaining member 84 which encompasses the outer race of a bearing 85. The inner race of each of the bearings 85 is supported by the inwardly extending flange 86 of a retainer member 87, 88, the latter being retained in fixed position on the shaft 50 by retainer rings 89 secured to the shaft by screws 91.

The annular member 84 associated with retainer member 88 is secured to the associated annular member 82 by bolts 92. THe annular member 84 associated with flange 87 has associated therewith a toothed pulley 93 which is secured in position by bolts 94 which also serve to retain the annular member 84 against member 82.

With the arrangement above described, it is apparent that upon rotation of the pulley 93 in the manner hereinafter to be described, the manifold sleeves 81, 81' as well as the spaced parallel discs 73 will rotate in unison around the fixed shaft 50, such rotation being facilitated by the bearings 68, 85 with the gaskets 78 providing a seal at the ends of each of the manifold sleeves 81, 81'.

As is shown in FIG. 11, the hollow shaft 50 has a plurality of openings 95 which provide communication between the chambers 54, 55 and the annular chambers 96, 97 defined by the manifold sleeves 81, 81'.

As is clearly shown in FIGS. 1, 5 and 11, for example, a plurality of valves 101 are secured in circumferentially spaced relationship to the outer peripheries of the spaced parallel discs 73. More particularly, referring to FIGS. 11 and 13, each of the valves 101 comprises a substantially rectangular block, positioned between the peripheries 74 of discs 73 and secured in position by screws 102. Each of the valves has tapered sidewalls and extends transversely between the discs, being circumferentially arranged therearound.

Figure 13:
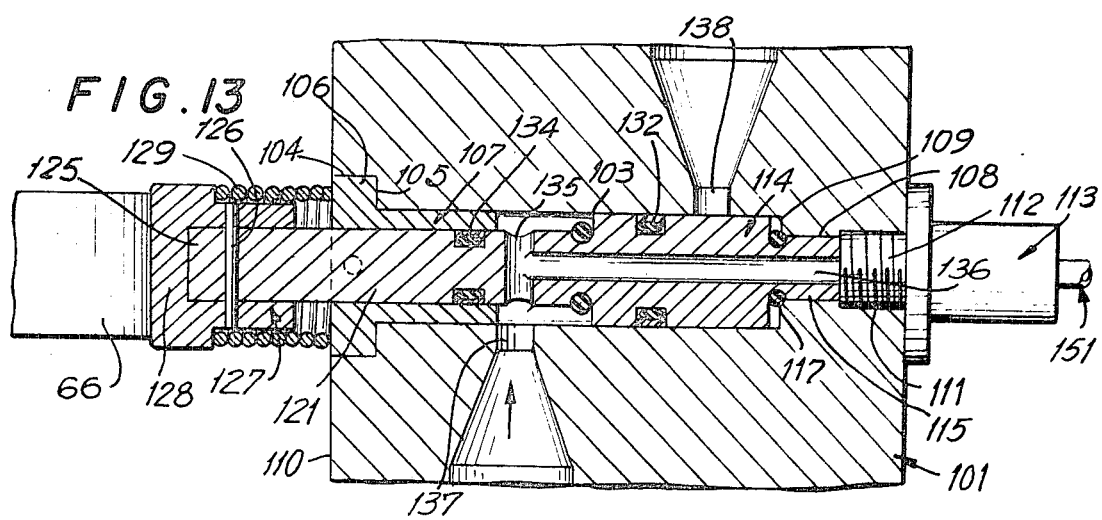
FIG. 13 is a sectional view on an enlarge scale of the control valve showing the latter in the pressure position.

Referring to FIG. 13, each of the valves has a bore 103 extending therethrough, the bores of the plurality of valves extending substantially radially of the hollow shaft 50. Each of the bores is of enlarged diameter at the inner end 104 thereof to define a shoulder 105 to receive the flanged end 106 of a bushing 107. The outer end of each of the bores 103 is of reduced diameter as at 108 to define an annular shoulder 109 and the extremity of said reduced diameter portion 108 is internally threaded as at 111 to receive the correspondingly threaded end 112 of a nipple 113.

Slidably mounted in the bore 103, is a valve member 114, which is of reduced diameter at its outer end 115, to define an annular shoulder 116. An O-ring 117 encompasses said reduced diameter portion 115, being positioned in an annular groove 118 adjacent shoulder 116. The diameter of said portion 115 is just slightly less than the diameter of said portion 108 of bore 103 so that said portion 115 may enter into the reduced diameter portion 108 as shown in FIG. 13 at which time the O-ring 117 will provide a seal.

The inner end of valve member 114 is also of reduced diameter to form an elongated stem 121 that extends slidably through the bushing 107 and protrudes beyond the inner end 110 of the valve 101. As is clearly shown in FIGS. 13 and 14, the root end of the stem 121 has an annular groove 122 encompassed by an O-ring 123, the latter being adapted to abut against the inner end 124 of bushing 107 to define a seal. Secured to the free end 125 of stem 121 by a transverse pin 126, is a cap 127, the latter having an enlarged head 128. A coil spring 129 encompassing the outer end of the stem, reacts against the head 128 and the end 110 of the valve 101, normally to urge the valve member 114 inwardly toward the hollow shaft 50.

As is shown in FIG. 13, the enlarged diameter portion of the valve member 114 has an annular groove 131 in which an O-ring 132 is positioned and the stem 121 also has an annular groove 133 in which an O-ring 134 is positioned. A transverse passageway 135 is provided in the stem 114 and is in communication with an axial passageway 136 extending through the valve member.

Figure 14:
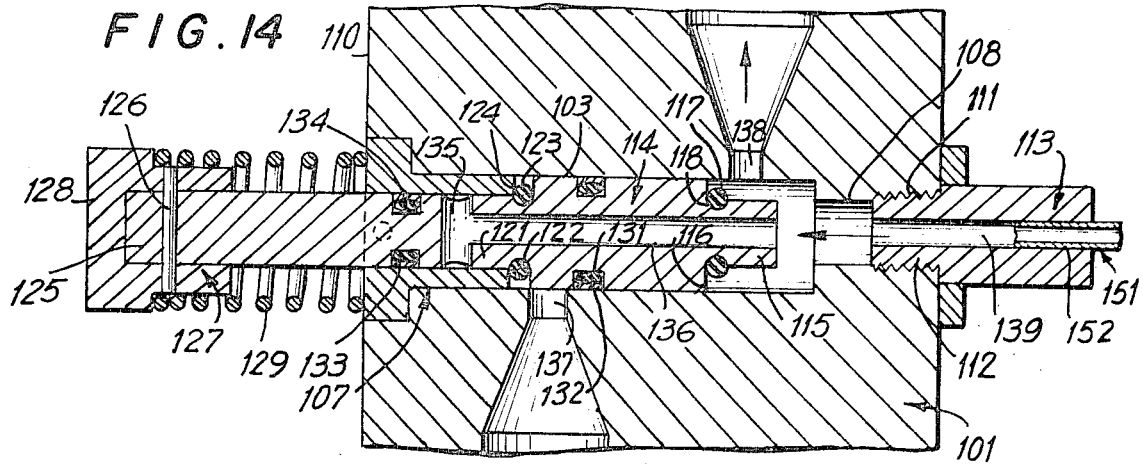
FIG. 14 is a view similar to FIG. 13 showing the valve in the suction position.

In the normal position of the valve member 114, shown in FIG. 14, when it is in extended position under the urging of coil spring 129, the enlarged diameter portion of the valve member 103 is aligned with pressure port 137 so that the latter is sealed, and the vacuum port 138 is aligned with the reduced diameter portion 115 of the valve member. As a result, the vacuum port 138 will be in communication with reduced diameter bore portion 108 which defines the outlet port of the valve and with the bore 139 of the fitting 113.

In the position shown in FIG. 13, in which the valve member has been moved inwardly, in the manner hereinafter to be described, the enlarged diameter portion of the valve member 114 will be aligned with vacuum port 138 to close the latter, the gasket 117 abutting against shoulder 109 to form a seal. In this position the transverse bore 135 is aligned with the pressure port 137 so that air under pressure will flow through transverse passageway 135 and longitudinal passageway 136 into the bore 139 of fitting 113. The gaskets 134 and 132 will provide a seal as shown in FIG. 13 to prevent communication between the pressure port 137 and the vacuum port 138.

As shown in FIG. 14, the O-ring 123 will seat against the end 124 of bushing 107 so that the O-rings 123 and 132 will cut off communication between the airport 137 and the vacuum port 138.

As is clearly shown in the drawings and particularly FIGS. 11 and 14, the vacuum ports 138 of each of the valves are connected by a line 140 to an associated opening 141 in the manifold sleeve 81. Similarly, the pressure ports 137 are connected through an associated line 142 to an associated opening 143 in the manifold sleeve 81'.

Thus, either vacuum or pressure will be applied to the bore 139 of fitting 113 in the manner hereinafter to be described.

Secured in each of the fittings 113 is one end of a pickup tube 151 which, as is clearly shown in FIGS. 4, 5 and 11, has a root end 152 which is mounted in the fitting 113 (FIG. 14), an intermediate portion 153 which is displaced substantially transversely from said root end 152 and an end portion 154 which extends in a plane substantially parallel to the plane of said root end 152, said end portion 154 having a pickup portion 155 extending at substantially right angles thereto and having to nozzle 156 (FIG. 19) at its free end.

More particularly, as shown in FIG. 4, the pickup portions 155 are circumferentially aligned with each nozzle 156, being circumferentially spaced from the end 157 of the next preceding adjacent portion 155.

Referring particularly to FIG. 19, in the illustrative embodiment of the invention herein shown, the nozzle 156 comprises a plug 158 retained as by force fit in the end 159 of pickup portion 155. The plug 158 has an axial bore 161 therethrough which is of enlarged diameter at its outer end 162 leading into a frustoconical cavity 163 in the outer end of the plug.

Secured to the surface of cavity 163 is a resilient diaphragm 164 which may be of rubber, the diaphragm having a central aperture 165 aligned with axial bore 161. As shown in FIG. 19, the periphery of aperture 165 in the diaphragm extends inwardly beyond the periphery of the outer edge of enlarged bore portion 162, the diameter of said aperture 165 being slightly less than that of the seed S to be picked up by the nozzle 156.

The function of the nozzle is to pick up one seed at a time when suction is applied to the bore 161. This operation will be described in greater detail hereinafter.

The valves 101 are successively actuated as the manifold sleeves 81, 81' and discs 73 are rotated in the manner hereinafter to be described, by the abutment of the head 128 of cap 127 secured to the end of each of the valve members 114 against the cam roller 66 mounted at the end of the fixed arm 65. More particularly, as the pickup assembly 40 is rotated, and the caps 127 successively abut against the roller 66, the associated valve member 114 will be moved inwardly from the position shown in FIG. 14 in which vacuum is applied to the port 138 and thence through the bore 139 of fitting 113 to the associated feed pickup tube 151, to the position shown in FIG. 13 in which the vacuum port 138 is closed and the pressure port 137 is connected through aligned passageways 135, 136 to the bore of fitting 113.

The pickup assembly is supplied with seeds by a seed supply assembly now to be described.

SEED SUPPLY ASSEMBLY

Referring to FIGS. 1, 4 and 7 to 10 inclusive of the drawings, the seed supply assembly 170 is positioned between the two side supports 33 and 34.

More particularly, the seed supply assembly comprises a chamber 170' consisting of a pair of side plates 171, 172 (FIG. 7) end walls 173, 174 at the upper portion of the housing 170 and downwardly inclined between walls 175, 176 positioned between the sidewalls 171 and 172 which form a trough, the lower end of which is closed by a transverse block 177 (FIG. 8). The housing 170 is supported at one end on the transverse strut 44 on a block 44' and at its other end by a transverse strut 60.

As shown in FIG. 4, a pair of toothed pulleys 178, 179 are rotatably mounted between the sidewalls 171, 172 on shafts 181, 182, the shaft 182 being in a lower plane than shaft 181. Encompassing the pulleys 178, 179 is a toothed conveyor belt 183, which, as shown in FIG. 6, has a groove 184 that is substantially V-shaped in cross section extending the entire length thereof and defining two parallel elongated reaction surfaces 184' extending parallel to said central groove 184. The portion 180 of the upper run 185 of the conveyor belt 183 between pulleys 178, 179 is conformed to move in an arc as shown in FIG. 4. To this end, the top edge 186 of each of the side plates 171, 172 has an arcuate portion and a plurality of rollers 187 extend inwardly from the curved edge 186 as is shown in FIGS. 4 and 6 and said rollers 187 are also in an arcuate path and bear against the reaction surfaces 184' of the conveyor belt 183. As a result of this arrangement it is apparent that upon rotation of the conveyor belt 183 in the manner hereinafter to be described, the upper run 185 of said belt will move in an arcuate path. The pickup portions 155 of the pickup tubes 151 are designed to move into the groove 184 in the conveyor belt 183 with said portions 155 extending longitudinally of said groove to pick up seeds carried by said conveyor belt in the manner hereinafter to be described. Desirably, the rate of movement of said conveyor belt 183 is slightly less than the rate of movement of the pickup assembly to facilitate pickup of the seeds.

The shaft 181, as shown in FIG. 5, mounts a gear 191 which meshes with a drive gear 192 mounted on shaft 193 which also mounts a pulley 194, the latter being driven by a belt 195 in the manner hereinafter to be described. Thus, upon rotation of pulley 194 and gears 192 and 191, the conveyor belt 183 will be rotated in a counterclockwise direction, referring to FIG. 4.

Means are provided to charge the conveyor belt 183 with the seeds to be encapsulated.

To this end, as shown in FIG. 4, for example, a feed tube 196 is mounted on the front wall 173 laterally displaced from a window 197, also mounted on said front wall, said feed tube having a funnel 198 at its upper end into which seeds may be poured.

The seeds will drop down the inclined wall 175 of the chamber 170' to the lower end thereof as shown in FIG. 8, for example.

As shown in FIGS. 7 and 8, the block 177 at the lower end of the trough defined by the inclined walls 175, 176 has a tapered top surface 199 leading into a vertical slot 201 which in turn leads into a transverse bore 202. Extending downwardly as shown in FIGS. 7 and 8 is an air nozzle 203 which is designed to blow a jet of air against the seeds as they fall by gravity down the sidewalls 175, 176 of the trough so that such seeds will be forced through the vertical slot 201 into the transverse bore 202. Desirably, baffles 205 are provided to deflect any seeds that may be forced upwardly, to the slot 201.

Secured in one end of the block 177 is an airline 204 which has a plurality of nozzles 205' of different length extending into said bore 202. Thus, when air under pressure is forced through line 204 it will entrain the seeds forced into the bore 202 through a feedpipe 206 which has one end secured to the other end of said bore 202.

As shown in FIGS. 1, 3, 4 and 7, the feedpipe extends upwardly from the block 177 into a chamber 207, an air nozzle 28, FIG. 8, being associated with the feedpipe 206 to assist in movement of the seeds into the chamber 207.

As shown in FIG. 4, the chamber 207 extends upwardly from the top wall 209 of a hopper 211, the latter illustratively being substantially rectangular as shown in FIG. 10 and having inspection windows 212 on two opposed walls thereof.

The floor 213 of the hopper 211 is downwardly inclined as shown and a discharge opening 214 is provided between the front edge of floor 213 and the lower end of wall 215 of hopper 213. Extending downwardly from said opening 214 is a chute 216 which tapers into a relatively narrow outlet end 217, the latter being aligned with and positioned directly over the elongated groove 184 in the conveyor belt 183 adjacent the pulley 179.

As the result of the foregoing arrangement, the seeds that are changed into the inlet or hopper end 198 of tube 196 will fall to the bottom of the chamber 120' and be entrained upwardly through the tube 206 into the hopper 211 to be discharged through chute 216 into the groove 184 in the conveyor belt and then advanced by said conveyor belt to the forward end 218 thereof, where the seeds will then be discharged down the inclined wall 175 for recirculation.

The chute 216 has an adjustable outlet end 217 so that the quantity of seeds discharged onto the conveyor belt 183 may be regulated. The quantity of seeds discharged from outlet 217 of chute 216 is such that the height of the seeds carried in the groove 184 in the belt will be above the plane of the nozzle end 156 of the pickup tube 155 to insure that the nozzle 156 will be embedded into the seeds so that it may dependably pick up one of said seeds in the manner to be described. The speed of rotation of the conveyor belt is adjusted so that it is slightly slower than the rate of advance of the nozzles 156 carried by the pickup assembly 40 to insure that the nozzles 156 will move into the seeds carried by the belt to insure dependable pickup.

As the pickup assembly 40 rotates, the nozzles 156, as shown at A in FIG. 4, will emerge from the groove 184 of the conveyor belt and successively pass through a notch 221 (FIG. 6) in an inclined baffle plate 222 (FIG. 4). As shown in FIG. 4, the baffle plate is secured between the sidewalls 171, 172 of the camber 170' and is downwardly inclined toward the end wall 173 thereof, being spaced therefrom as at 223.

Means are provided to remove any excess seeds that may adhere to the nozzles 156 as they pass through the notch 221.

To this end, as shown in FIGS. 4 and 6, a block 224 is secured to each of the walls 171, 172 adjacent the arcuate edge 186 thereof and above the level of the baffle plate 222. Each of the blocks 224 carries a plurality of air nozzles 225 which are directed downwardly and inwardly leaving a space 226 therebetween through which the nozzles 156 may pass as the pickup member is rotated. The air nozzles 225 are connected to a suitable source of air under pressure and will blow jets of air against the ends of the nozzles 156 so that any seeds adhering thereto will be removed and will flow down the baffle plate 222 into the chamber 170' to be recirculated. The velocity of the air jets from nozzles 225 is such that although it will readily remove loose seeds adhering to the nozzles 156, it will not remove the single seed retained by vacuum in the nozzle itself.

More particularly, as shown in FIG. 19, the tip of the seed S will be drawn into the recess 162 in the nozzle by the vacuum applied to the bore 161 thereof and will be securely retained in the recess by the vacuum applied to bore 161.

It is to be noted that some slight vacuum may be present at the periphery of the recess 162 which could retain additional seeds S' in the nozzle. However, such additional seeds are only retained in place by relatively slight force and hence will readily be discharged by the air nozzles or air knives 225, as previously described.

With continued rotation of the pickup device, the seed carried by each of the nozzles 156 is advanced to a discharge station including a seed discharge assembly 230 where the seed is released for further processing.

SEED DISCHARGE ASSEMBLY

Figure 12:
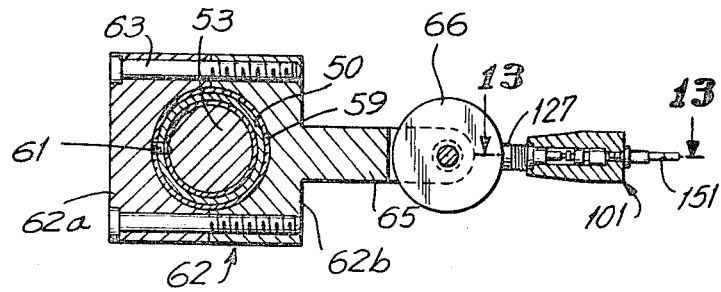
FIG. 12 is a sectional view taken along line 12—12 of FIG. 11.
Figure 15:
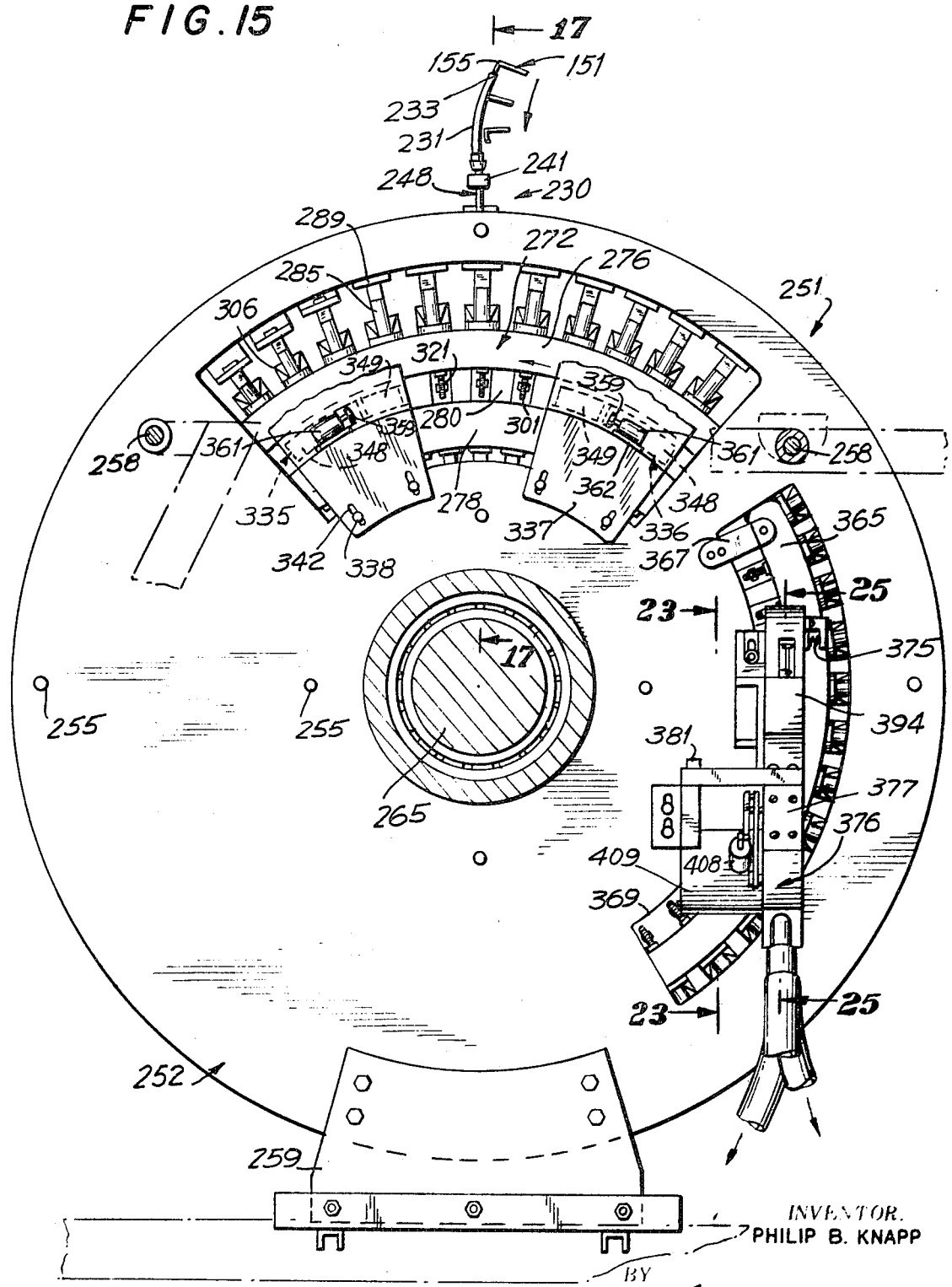
FIG. 15 is a longitudinal view partly in cross section taken along line 15—15 of FIG. 2.

As shown in FIGS. 1, 11, 15 and 17, the discharge station includes a discharge tube 231 which is curved as shown in FIG. 15 and has a slot 232 in the wall portion thereof facing the pickup assembly 40, extending from its upper end 233 downwardly a portion of the length of the tube 231. The length of the slot 232 is such that the end portion 155 of each of the pickup tubes may enter into the slot, move downwardly through the slot in an arcuate path corresponding to the curve of the upper portion of the discharge tube 231 and then move out of the slot as is clearly shown in FIGS. 15. The cam roller 66, shown in FIGS. 11, 12 and 13, is so positioned that when the portion 155 enters the slot 232, the cam roller 66 will react against the cap 127 of an associated valve member 114 and move the latter inwardly from the position shown in FIG. 14 to the position shown in FIG. 13 so that the suction port 138 will be closed and the air pressure port 137 will be opened. As a result, a jet of air under pressure will be applied through passageways 135, 136 (FIG. 13) into the bore of the pickup tube 151 and through said bore into the bore 161 of nozzle 156 (FIG. 19) to force the seed S outwardly so that it will be expelled downwardly through the discharge tube 231.

As shown in FIG. 17, the lower end of the discharge tube 231 has a funnel 235 secured thereto, said funnel having a cylindrical outlet stem 236 with a bore 237 extending therethrough. The funnel 235 and the discharge tube 231 secured thereto are rigidly supported, as shown in FIG. 17, by a bracket 238.

Secured to the stem 236 of funnel 235 is a casing 241 which is also supported by the bracket 238. The casing 241 has a vertical bore 242 therethrough in the upper end of which the stem 236 is secured. A passageway 243 extends transversely through casing 241 intercepting vertical bore 242. A source of light 244 is positioned in one end of passageway 243 and a photocell 245 in the other end. Thus, when a seed S is discharged through the bore 237 of stem 236 and through bore 242, it will interrupt the rays of light from source 244 to photocell 245 and through a conventional amplifier 247 (FIG. 27) to deliver a pulse. The function of which will be hereinafter described. A feed tube 248 is secured at one end in outlet end of bore 242, said feed tube 248, as shown in FIG. 17, being designed to conduct the seeds S as they are successively discharged from the pickup nozzles 156 into the pellet-forming assembly 251.

PELLET-FORMING ASSEMBLY

Referring to FIGS. 1, 2, 3, 15, 16 and 17, the pellet-forming assembly comprises a rigid cam plate 252 in the form of a disc having a hub portion 253 and a rim portion 254 secured to the plate 252 as by screws 255. The inner faces of the hub portion 253 and the rim portion 254 each has a cam track 256, 257 formed therein. The plate 252 is rigidly supported on the frame by means of brackets 258 secured to the upper end of the side support 34 and by means of an upright plate 259, secured at its upper portion to the lower portion of disc 252 and at its lower portion an angle bar 261 secured to transverse struts 262 forming part of the base 32 as shown in FIG. 1. With the arrangement thus described, the plate 252 is rigidly supported in fixed position.

As shown in FIG. 1, a pair of transversely aligned blocks 263, are secured to the struts 39, 41 and rotatably mount a main drive shaft 265. Illustratively, the plate 252 has an axial bore 265' extending therethrough (FIG. 17) with an axial sleeve 266 extending outwardly therefrom and rigid therewith which extends through the block 264, being rigidly clamped therein. Positioned in said bore 265' is a bearing 267 through which the shaft 265 extends. The assembly above described insures that the shaft 265 will remain in axial alignment with the cam plate 252.

Keyed to shaft 265 as at 268 is a hub 269 (FIG. 17) which extends through an axial opening 271 in a disc 272, the hub having an annular flange 273 secured to the periphery of opening 271 as by screws 274 so that the disc 272 will rotate with the shaft 265 in the manner hereinafter to be described.

As shown in FIG. 17, the disc 272 is of diameter less than the inner diameter of rim 254 and has an annular flange 276 at its outer periphery on the outer surface 277 thereof adjacent the cam plate 252. In addition, the surface 277 of the disc 272 also has an annular hub 278 which is of diameter less than that of annular flange 276 and coaxial therewith to define an annular space 280 therebetween. Equidistantly spaced around the periphery of the annular flange 276 and extending radially therethrough is a plurality of bores 279 in each of which is secured a bushing 281. Each of said bores 279 is aligned with a radial bore 282 extending through the annular hub 278. A bushing 283 defining a mold cavity, is secured in the upper end of each of the bores 282 and a second bushing 284 is secured in the lower end of each of said bore 282.

Slidably mounted in each of the upper bushings 281, is a cylindrical plunger 285 which is of length sufficient so that it may be moved downwardly, in the manner hereinafter to be described, through the space 280 between the annular flange 276 and annular hub 278 into the bushing 283. The plunger 285 has secured to its outer end a rod 287 which is secured as by a screw 288 to the horizontal leg 289 of a bracket 291, the upper end of the vertical leg 292 of which mounts a roller 293 which rides in the upper cam track 257. Positioned in each of the bushings 283 is a plunger 294 which is secured to a rod 295 extending through the bushing 284. The lower end of each of the rods 295 is secured to an L-shaped bracket 296, the vertical leg 297 of which mounts a roller 298 that rides in cam track 256.

The cam tracks are so conformed that at the appropriate portions of the cycle of rotation of disc 272, the plungers 285 and 294 will be reciprocated to form a pellet in the manner hereinafter to be described.

Associated with each of the bushings 283 which defines the mold cavity in which the pellet is formed, is a resilient tube 301, preferably formed from a coil spring, which has a nozzle 302 at its outlet end and a bushing 303 at its inlet end which is mounted in the lower end of an associated passageway 304 extending through the periphery of the disc 272 and aligned with each of the bushings 283.

As shown in FIG. 17, in the normal position of the resilient tube 301, its outlet or nozzle end 302 is aligned with and positioned directly over the mouth of an associated bushing 283. The outer end of each of the passageways 304 is illustratively internally threaded to receive the correspondingly threaded end 305 of a funnel 306, the latter extending upwardly from the periphery of the disc 272.

As shown in FIG. 17 the outlet end of the feed tube 248 is secured in a bore formed in a plate 307, spring mounted on the horizontal arm of a bracket 308 depending from a plate 309 secured to the periphery of the annular rim 254, said plate 309 also mounting the bracket 238.

The plate 307 has a beveled undersurface 311 against which the inclined inlet end of the funnels 306 will successively abut as the disc 272 is rotated. Thus, individual seeds will be forced through the feed tube 248 and the associated funnel 306 through the resilient tube 301 to be discharged into the mouth of an associated bushing 283.

Associated with each of the resilient tubes 301 is an adjustment member which reacts against the resilient tube 301 to insure that its outlet end 302 will be aligned with the mouth of an associated bushing 283.

More particularly, as shown in FIGS. 17 and 24, a yoke 313 is provided, the legs of which straddle the resilient feed tube 301, the crosspiece of the yoke being secured to a pin 314 which extends through sleeve 315 secured at one end in a threaded recess 316 in the disc 272. The pin 314 extends through an opening in the closed outer end of the sleeve, the extending portion being threaded to mount adjustment nuts 317. Coil spring 318 compressed between the closed end of sleeve 315 and a flange 319 on the pin 314 normally urges the pin and the yoke 313 mounted thereon against the resilient tube 301. By adjusting the position of the nuts 317, the position of the yoke can be set to maintain the nozzle end 302 of the resilient tube 301 in alignment with the bushing 283.

As shown in FIGS. 15 and 17, a recess 321 is provided to accommodate the yoke 313 so that when the resilient tube 301 is deflected to the right, referring to FIG. 17, upon downward movement of plunger 285 into the bushing 283, free movement of the tube 301 will be permitted.

Means are provided to rotate the disc 272 and the seed pickup assembly 40. To this end, a drive motor M is provided (FIGS. 1–3) which through shaft 323 and reducer 324 will drive sprocket chain 326 to sprocket wheel 327 secured to shaft 265 to rotate said shaft and the disc 272. Also mounted on shaft 265 is a toothed pulley 328 which, through toothed belt 329, drives toothed pulley 93 shown in FIGS. 5 and 11, thereby to rotate the pickup assembly 40. In addition, the shaft 265 mounts a pulley 331 which through belt 195 drives pulley 194 (FIG. 50 to rotate meshing gears 192, 191 thereby to advance the conveyor belt 183.

Means are provided successively to charge the mold cavities defined by the bushings 283, as the disc 272 rotates.

To this end, a mold-charging assembly is provided as shown in FIGS. 15, 20 and 21.

CAVITY-CHARGING ASSEMBLY

As shown in FIGS. 15 and 20, a pair of hoppers 335 and 336 are provided, each of which has a depending flange 337 on its outer face by means of which the hoppers may be secured by screws 338 to the rigid cam plate 252.

As shown in FIGS. 15 and 17, the hoppers 335 and 336 are equidistantly spaced from either side of the feed tube 248 through which seeds are successively expelled into an associated bushing 283.

As is clearly shown in FIG. 20, each hopper has an arcuate bottom surface 339 of curvature corresponding to that of the surface 341 of the annular hub 278 of the rotatable disc 272 through which the bushings 382 are exposed. By reason of the vertical slots 342 shown in FIG. 15, in the flanges 337 the hoppers may be positioned so that their bottom surface 339 rests against the surface 341 of the hub 278 with sufficient clearance solely to permit free rotation of the disc.

Referring to FIG. 20, each hopper has two opposed longitudinal walls 343 and 344 and two end walls 345 and 346. A partition 347 extending transversely across the hopper divides the latter into two chambers 348 and 349, the lower edge 351 of the partition 347 also being closely adjacent the surface 341 of the hub 278 to prevent movement thereunder of material contained in the hoppers yet permitting free rotation of the disc 272. A funnel 352 shown in broken lines in FIG. 20 and in solid lines in FIG. 21, is secured to the open top of each hopper to facilitate charging of each of the chambers 348 and 349, the inner surface of the sidewall 343 of the hopper being inclined inwardly as shown to facilitate downward movement of the material charged thereinto.

Positioned in the chamber 349 of each of the hoppers is an agitator unit comprising a central shaft 353 extending longitudinally of the chamber and rotatably mounted at each end in the partition 347 and in a strut 354 extending transversely across the chamber. The shaft 353 has secured thereto near each end a pair of discs 355 to which are secured the ends of elongated agitator rods 356. The shaft 353 extends into the partition 347 which is hollow and mounts a pulley 357 which is connected by belt 358 to a pulley 359 mounted on the drive shaft of a motor 361 carried by a plate 362 secured to the flange 337. Thus, upon energization of the motor 361 the shaft 353 will rotate to agitate the material in chamber 349 of each hopper.

As is clearly shown in FIG. 15, the hoppers are arranged so that as the disc 272 rotates in a clockwise direction, the mold cavities defined by the bushings 283 will first pass through the chambers 348 and 349 of hopper 335 to be successively charged with the materials in such chambers and then after passing the seed-discharging station 230, will pass beneath the chambers 349 and 348 to be charged in reverse order.

It is to be noted that as the disc 272 rotates, referring to FIG. 21, the flexible tube 301 will be deflected away by the wall 344 of each trough.

After the mold cavities have been charged and the pellets have been formed in the manner hereinafter to be described, the pellets are advanced to a discharge assembly will now be described.

PELLET DISCHARGE ASSEMBLY

The pellet discharge assembly is shown in FIGS. 15 and 22 to 26 inclusive.

Referring to FIGS. 22 to 26 and particularly to FIG. 26, means are provided to eject the pellets from the mold cavities defined by the bushings 283. More particularly, such means comprises an arcuate support strip 365 which has a recess 366 in the outer surface thereat The support strip 365 is positioned so that it extends at right angles to the mold cavity defined by the bushing 283 as shown in FIG. 24. To this end, a pair of brackets 367 are provided each of which has a mounting leg secured by screw 368 to the fixed plate 252 at the edge of an arcuate opening 369 therein, a leg which is secured by screws 371 to the ends of the arcuate strip 365. As a result, the arcuate strip 365 will be rigidly retained in position.

Figure 22:
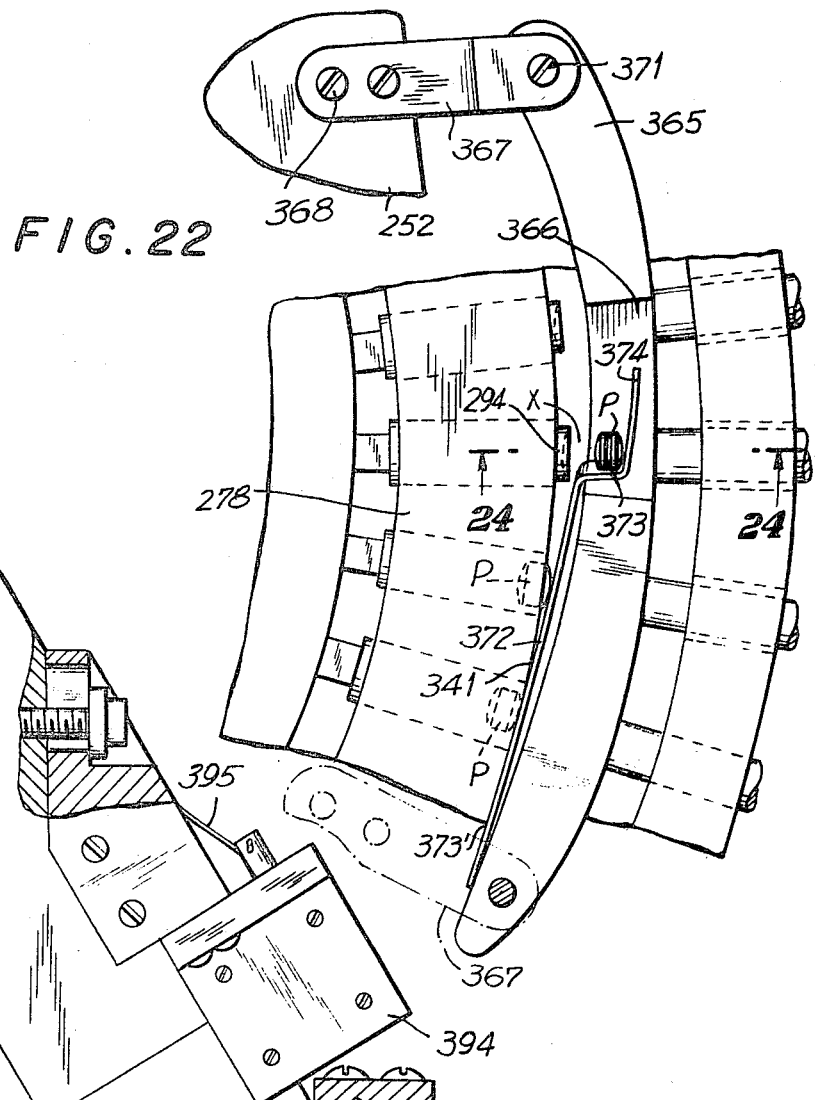
FIG. 22 is a fragmentary side elevational view of a portion of the pellet discharge station.

Referring to FIGS. 22 and 26, a leaf spring 372 is provided which has one end 373' secured as by welding to the end of the arcuate strip 365, said strip extending upwardly as shown and being biased so that it presses lightly against the surface 341 of the hub 278 of the rotating disc 272 through which the mold cavities defined by the bushings 283 are exposed.

The purpose of the resilient strip 372 is to prevent dislodgment of the pellets that have been formed in the cavities until they reach the desired discharge position, which is shown in FIG. 22, for example,.

Referring to FIGS. 22 and 26, the resilient strip 372 has a leg 373 extending at right angles thereto and inclined downwardly as shown. Extending outwardly from the free end of said inclined leg 373 is an upstanding leg 374 which serves as a deflector for the pellet when the latter is ejected from the mold cavity and also serves as an abutment against which a coil spring 375, FIGS. 15, 26, reacts to maintain said leaf spring against the surface 341 of the hub 278.

Thus, when the pellet is ejected from the cavity in the manner to be described, as shown in FIGS. 22 and 24, it will abut against the leg 374 and then roll down the inclined leg 373 into the distribution assembly.

It is to be noted, as shown in FIG. 24, that the rear surface of the arcuate strip 365 is curved to act as a deflector for the resilient feed tube 301 as the latter are successively moved by the strip with rotation of the disc 272.

DISTRIBUTION ASSEMBLY

The distribution assembly is clearly shown in FIGS. 15, 23, 25 and 26. Thus, such mechanism comprises an elongated casing 376 which has a bracket 377 secured to its top surface 378, said bracket mounting one end of a support strip 379, the other end of which is secured by screws 381 to the leg 382 of an L-shaped bracket 383, the other leg of which is secured by screws 384 to the rigid disc 252, thus mounting the casing 376 at an angle with respect to such rigid disc. The upper end of the casing defines an inlet 384 having an inclined floor 385 shown in FIGS. 25 and 26 positioned closely adjacent the lower edge 386 of the inclined leg 373 of the leaf spring 372. As a result, the pellets with which move down said inclined leg 383 will also ride down the inclined floor 385 of the inlet of the distribution casing. deflector for the pellet when the latter is ejected from the mold cavity and also serves as an abutment against which a coil spring 375, FIGS. 15, 26, reacts to maintain said leaf spring against the surface 341 of the hub 278.

As shown in FIG. 25, the inlet 384 is in communication with two passageways 387 and 388 extending substantially longitudinally through the casing 376. Due to the inclination of the floor 385 and the position of the inlet 389 of passageway 388, the pellets moving down said floor 385 would normally move into the passageway 388.

Means are provided to close the inlet 389 of said passageway 388 so that the pellets will move through the passageway 387. To this end, as is shown in FIGS. 25 and 26, the top wall 378 of the casing 376 has an aperture 391 in which is pivotally mounted a substantially L-shaped gate member 392. The gate member is normally positioned so that the leg 373 thereof extends longitudinally of the top wall providing access into the inlet 389 of passageway 388. Upon pivotal movement of the gate member in a counterclockwise direction as shown in FIG. 25, the leg 393 thereof will be moved so as to close the inlet of passageway 388 in which case the pellet moving down inclined floor 385 will strike said leg 393 to be deflected into passageway 387.

In the preferred embodiment shown, the L-shaped gate member 392 is actuated by a solenoid 394 secured to the top surface of casing 376 and having its piston rod connected by link 395 to the actuating leg 396 of the gate member. The purpose of the gate 392 is to separate those pellets in which a seed has been positioned from those pellets in which no seed has been positioned.

Thus, the outlet end 396 of passageway 387 is connected by a discharge tube 397 to a container (not shown) in which defective pellets may be received and the outlet 398 of passageway 388 is connected by discharge tube 399 into a container (not shown) in which usable pellets are to be received. Since, under usual conditions of operation there will be very few defective pellets and a considerably larger number of usable pellets, and since the pellets will be continuously discharged through the passageway 388, in order to facilitate handling of the usable pellets, means are provided to shift the discharge of usable pellets from one container that has been filled, to a second empty container.

Figure 23:
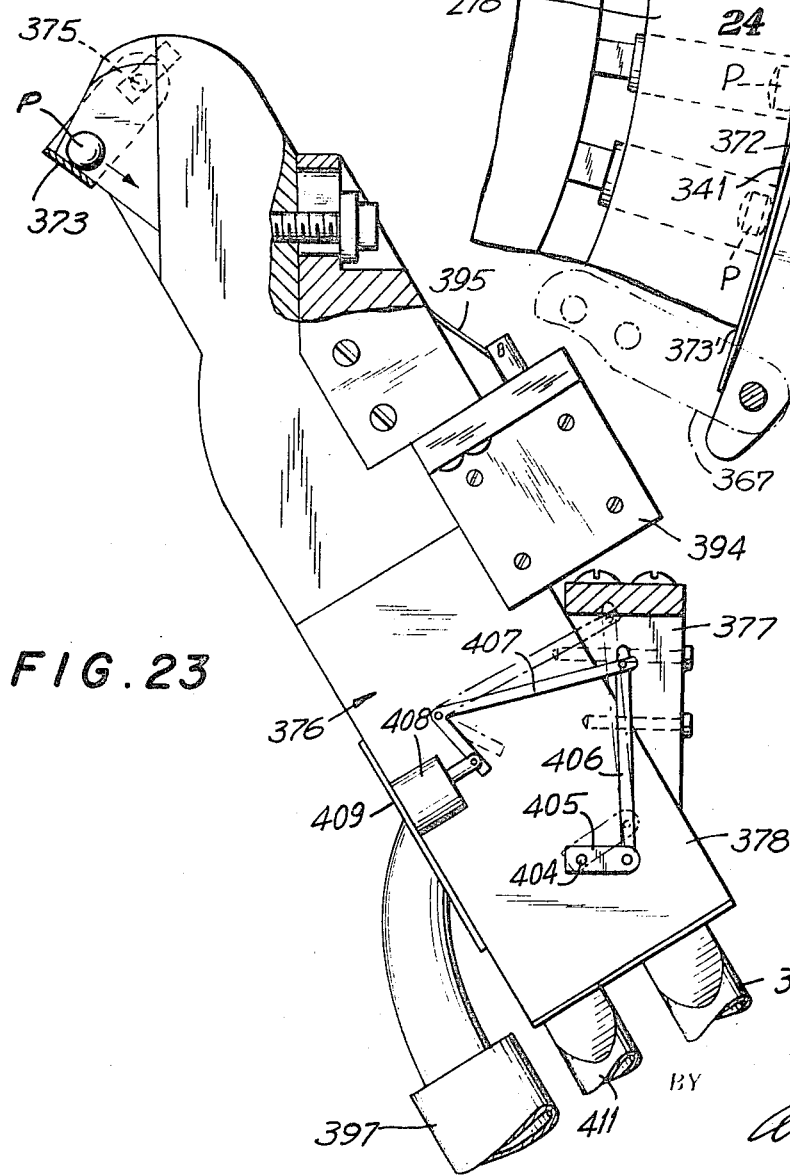
FIG. 23 is a side elevational view partly in cross section of the pellet-distributing unit taken along line 23—23 of FIG. 15.

To this end as shown in FIG. 25, an additional passageway 401 is provided leading into the passageway 388 and a valve member or gate 402 extends across the inlet 403 to passageway 401, being secured to a shaft 404. As shown in FIGS. 23, 25 and 26, the valve or gate normally closes the inlet 403. The shaft 404 mounting the gate 402 is controlled by links 405 and 406 and crank 407 which is connected to a solenoid 408 mounted on a plate 409 secured to the bottom of the casing 376. Upon energization of the solenoid 408, through the linkage above described, the gate 402 may be pivoted in a counterclockwise direction, referring to FIG. 25, so that the pellets moving down the passageway 388 will be deflected by the gate 402 into passageway 401 which is connected by discharge tube 411 to another container.

SELECTION CIRCUIT

Means are provided to actuate the solenoid 394 of the distribution assembly in order to select between those pellets in which a seed is properly positioned, and those pellets in which no seed is positioned.

Although any suitable means involving a memory circuit may be used to actuate distribution solenoid 394, a typical system is diagrammatically shown in FIGS. 27 and 27a.

Referring to FIG. 27, a disc 415 is provided which is either directly driven by the shaft 265 or which may be driven by an independent electrical motor 416' operating in synchronization with shaft 265.

The disc 415 mounts on one surface thereof adjacent its outer periphery a plurality of contact members 416, corresponding in number of the number of mold cavities defined by the plurality of bushings 283 in the rotating disc 272 and equidistantly spaced around the periphery of said disc 416. The contact members 416 are designed successively to engage a fixed wiper arm 417 as said disc 415 rotates. Thus, each time a mold cavity is aligned with the seed discharge nozzle 301 at the seed discharge station 230, shown in FIG. 15, a contact member 416 will be engaged by said wiper arm 417. The wiper arm 417 is connected to the output of amplifier 247 which in turn is connected to the photocell 245 shown in FIG. 18. Thus, said wiper arm will be energized each time a seed intercepts the light to the photocell 245, which will occur when an associated mold cavity is positioned at the discharge station 230 and an associated contact member 416 is engaged by the wiper arm 417.

Associated with each of the contact members 416 and mounted on the disc 415 is a relay unit 418 shown in FIG. 27a. Each relay unit comprises a main relay RL-1, one end of the coil of which is connected by lead 419 to an associated contact member 416. The coil is also connected through normally closed contacts 421, 422 of a holding relay RL-2 and lead 423 423 to fixed contact 424 of relay RL-1. The other end of the coil of relay RL-1 and one end of the coil of relay RL-2 are connected to ground. The fixed contact 425 of relay RL-1 is connected by lead 426 to a contact member 427 associated with each of said relays. A corresponding plurality of contact member 427 are also being provided. The movable contact arms 428 and 429 of relay RL-1 are ganged together to move in unison and are connected by a lead 431 to a conducting ring 432 carried by the disc 415 and engaged by a fixed wiper arm 433 connected to a positive source of potential.

Associated with each of said contact members 427 and positioned so as to trail the latter with rotation of said disc 415 in a counterclockwise direction, referring to FIG. 27, is a reset contact member 434.

The contact members 427 are designed successively to engage a fixed wiper arm 435 positioned to engage such contact when the associated mold cavity defined by bushing 283 is aligned with the deflector leg 373 (FIG. 22). The wiper arm 435 is connected to the solenoid 394. Thus, if a seed has been properly ejected past the photocell 245 to cause relay RL-1 to be energized, and the associated contact member 427 to be connected to the positive source of potential through the conducting ring 432, when said contact member 427 and the associated mold cavity reach the discharge station, the solenoid 394 would be energized to actuate the distribution assembly in the manner hereinafter to be described.

With further movement of the disc 415, the reset contact 434 would engage the associated wiper arm 436 to connect a positive source of potential to the coil of relay RL-2 to open its contacts 421, 422 thereby opening the holding circuit for relay RL-1 and resetting the latter.

OPERATION

In the operation of the equipment a source of air under pressure is applied to air inlet 52 (FIGS. 1 and 11), air line 204 (FIG. 8), air nozzles 203, 208 (FIG. 8) and air nozzles 225 (FIG. 6). In addition, a source of vacuum is applied to line 51 (FIGS. 1 and 11).

Figure 3:
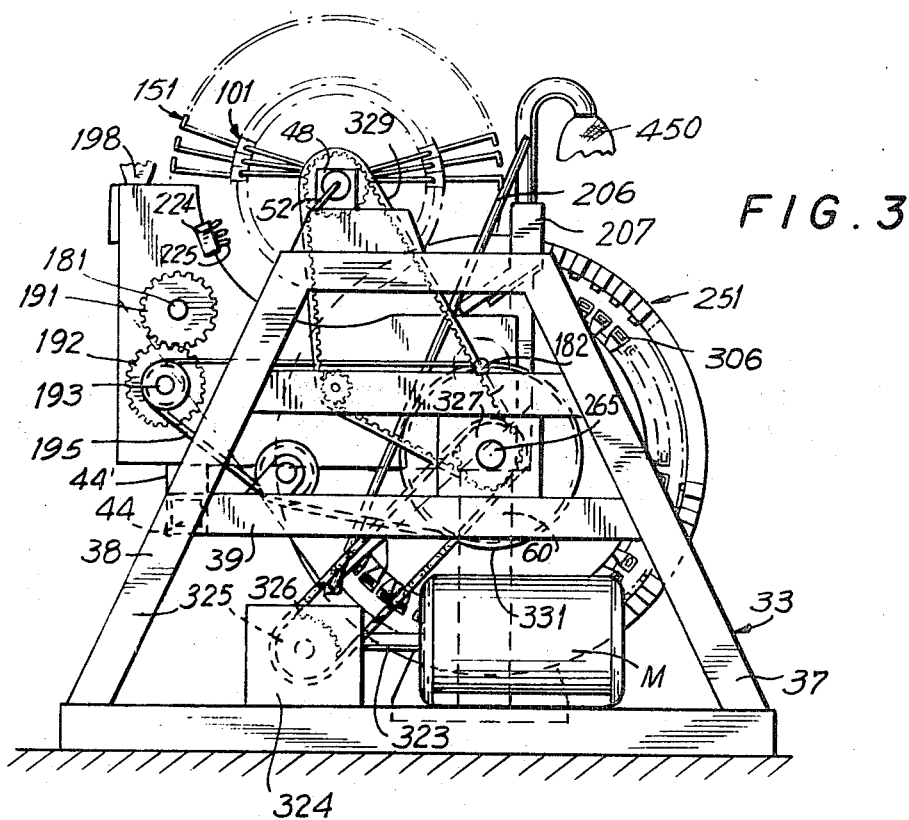
FIG. 3 is a side elevational view thereof taken along line 3—3 of FIG. 2.

A charge of seeds S, for example, which have the shape shown in FIG. 19, is poured into the funnel 198, FIG. 3 and 4. Thereupon, a charge of the materials in which the pellet is formed is poured through the funnels 352 to fill the chambers 348 and 349 of the hoppers 335, 336 (FIGS. 15 and 20).

According to one illustrative embodiment of the invention, in which the pellet P or environmental seed cell is of the type shown in copending application Ser. No. 781,014, the pellet P, as shown in FIGS. 28 and 29, has two outer layers 441 and 442 and an intermediate layer 443 which is formed of two layers 444 and 445, the seed S itself being positioned between the intermediate layers 444 and 445.

As shown in FIGS. 28, 29, each of the outer layers 441 and 442 is substantially in the form of a disc having a central mound or hemispherical portion 446 on one surface thereof located in the center of each disc. The material forming the intermediate layers 444 and 445 consists of a compound which is compressible, flowable and of extremely small particle size, such as remilled "Sorbitol" which forms a cushion for the seed S interposed between such layers.

Each of the outer layers 441 and 442 is illustratively formed from a mixture of peat moss or sphagnum moss, wood cellulose, Vermiculite, lime, a wetting agent potassium nitrate and diammonium phosphate. Such materials, which are in the form of a powder, create a mixture of hygroscopic materials and nutrients for each seed and the cushioning material is a water-soluble compressible mixture.

As the function of such layers is fully set forth in said copending application and per se, forms no part of this invention, they will not be further described.

After the funnel 198 and the chamber 170' in communication therewith, is charged with seeds and the chambers 348 of hoppers 335, 336 are charged with the material for forming the outer layers 441 and 442 and the chambers 349 of hoppers 335, 336 are charged with the material for forming the cushioning layers 444 and 445 of the pellet, the drive motor M is then energized.

As a result, referring to FIGS. 1 and 3, for example, through the drive imparted from speed reducer 324, the sprocket chain 326 will rotate, to drive the sprocket wheel 327 on shaft 265. Rotation of shaft 265 will, through drive belt 329, rotate drive pulley 93 (FIG. 11) thereby to rotate the pickup unit 40. At the same time rotation of shaft 265 will rotate drive pulley 194 mounted on idler shaft 193 (FIGS. 3 and 5) to rotate said idler shaft 193 and through gears 192, 191, rotate shaft 181 (FIGS. 4 and 5) and the pulley 178 mounted thereon.

Referring to FIGS. 4, rotation of pulley 178 will drive conveyor belt 183 and pulley 179 mounted on idler shaft 182 to advance said conveyor belt in a counterclockwise direction, referring to FIG. 4, while the pickup unit 40 is rotating in a clockwise direction.

Referring to FIGS. 3, 4 and 7 to 9 inclusive and particularly to FIGS. 4 and 8, the seeds S charged into the funnel 198 would fall down the inclined wall 175 of the chamber 170' to the lower end of the letter and the air jet from nozzle 203 (FIGS. 7 and 8) would force such seeds through the slot 201 into the transverse bore 202. Due to the air jets from nozzles 205, the seeds would be forced through tube 206, assisted by air jet 208, upwardly through such tube, referring to FIGS. 3 and 4, into the chamber 207. The lighter chaff which would be entrained with seeds would be blown upwardly into the collecting bag 450 shown in FIG. 3. The heavier seeds will drop downwardly into the hopper 211 and thence be discharged through the relatively small outlet 217 of the discharge chute 216 into the V-groove 184 in the conveyor belt 183.

The quantity of seeds discharged into the V-groove 184 of conveyor belt 183 is such as substantially to fill such groove.

It is apparent that when the conveyor belt 183 moves around the pulley 178, the seeds remaining in the groove 184 will be discharged to fall down the inclined wall 175 for recirculation.

With the arrangement above described, the seeds will be continuously recirculated and since the number of seeds which will normally be in the chamber 170' and carried by belt 183 at any one time, is far greater than the number that will be picked up by the pickup unit 40 during each cycle thereof, as will be hereinafter described, recharging of the chamber 170' need be done at only infrequent intervals.

As previously described, the pickup device 40 is rotating in a clockwise direction, referring to FIG. 4, and the speed of the pickup device is just slightly less than the speed of advance of the conveyor belt 183 so that the pickup nozzles 156 (FIG. 19) carried by the portions 155 of the pickup tube 151 will abut against a mass of such seeds to insure dependable pickup of one seed by the nozzle 156.

Referring to FIGS. 4, 11 and 19, when the nozzles 156 are moving through the pass of seeds carried by the upper run 185 of the conveyor belt 183, the valve members 114 of the valves 101 associated with pickup tubes whose nozzles are aligned with the upper run 185, will be in the position shown in FIG. 14 in which the port defined by the bore 139 of fitting 113 to which the pickup tubes 151 are connected, will be connected to the suction port 138 of the valve 101 and the pressure port 137 of the valve 101 will be closed by the valve member 114.

As is clearly shown in FIG. 11, the ports 138 are connected through the lines 140 to the vacuum chamber 96 and thence through openings 95 to the vacuum chamber 54 of hollow shaft 50 which is connected to vacuum line 51 to which a source of vacuum is applied.

As the result of such vacuum applied to the bores 139 and hence through pickup tubes 151 to the end portions 155 thereof, suction will be applied to the bore 161 of nozzle 156. As the result of such suction, as the nozzle 156 moves through the mass of seeds in the V-groove in the upper run 185 of the conveyor belt 183, a seed S (FIG. 19) will be drawn inwardly moving through the openings 165 in the resilient diaphragm 164 secured to the end of the nozzle so that a seal will be formed by the resilient periphery of the diaphragm around the end of the seed, securely to retain the latter in position. It is of course possible that some slight leakage may occur around the periphery of the opening 165 which could cause the ends of the other seeds S' also to be retained in the nozzle, but such other seeds S' are only lightly held and will be readily removed in a manner hereinafter to be described.

Referring FIG. 4, as the nozzles 156 move away from the arcuate portion 186 of the conveyor belt 183 which define the seed pickup station, they will successively pass through the notch 151 (FIGS. 4 and 6) of the inclined plate 222 and will be exposed to the air jets from nozzles 225 which will blow excess seeds S' retained by the nozzles away from the latter to be discharged down the inclined plate 222 into the chamber 170' for recirculation.

The jets of air from the nozzles 225 are of relatively low velocity sufficient to discharge all of the seeds S' retained on the nozzle except the seed S whose and extends through the opening 165 in the flexible diaphragm 164 and hence is subjected to a relatively high suction.

The illustrative embodiment shown, the pickup unit has 48 pickup nozzles and hence it is apparent that even at a relatively slow rotation of the pickup unit, which may be in the order of 20 r.p.m., the number of seeds that will be picked up will be in the order of 57,000 per hour.

As the pickup device 40 rotates, the portions 155 of each pickup tube will be successively advanced to the seed discharge station 20 formed by the discharge tube 231 shown, for example, in FIGS. 1, 15 and 17.

As is clearly shown in FIGS. 15 and 17, the ends 155 of each pickup tube 151 will enter the upper end of the discharge tube 231, which has an arcuately curved portion, and ten move through such curved portion which has a slot 232 extending the length thereof, and then move out of such curved portion. While the end 155 of the pickup tube is passing through the arcuate portion of the discharge tube, at such time, referring to FIGS. 11, 12 and 13, the cap 127 of a valve member 114 of a valve 101 will have been moved into juxtaposition to the cam roller 66 and hence such cam roller will engage the cap 127 to move the valve member 114 from the position shown in FIG. 14 to the position shown in FIGS. 13. As the result of such movement of the valve member 114, the vacuum port 138 of the associated valve member 101 will be closed and the pressure port 137 will be opened and in communication through passageways 135, 136 with the bore 139 of fitting 113. Consequently, the vacuum to the nozzle 156 positioned in the discharge tube 231 will be cut off and air under pressure will be applied to such nozzle 156 through the lines 142 (FIG. 11), pressure chamber 97, openings 95 in hollow shaft 50 and pressure chamber 55 which is connected to a source of air under pressure through line 52. This will cause the seed to be ejected from the nozzle 156 through the lower end of the discharge tube 231 into the funnel 235, secured to such lower end as shown in FIG. 18.

Referring to FIGS. 17 and 18, the seed S will be forced through the seed-sensing station defined by the seed-sensing casing 241 into the mold-charging station at the lower end of the tube 248 as shown in FIG. 17.

More particularly, the seed will be forced through the vertical bore 242 of casing 241 to intercept the light from the source 244 to the photocell 245. In other words, if the pickup nozzle 156 had properly picked up a seed from the conveyor belt 183 and such seed had properly been ejected through the funnel 236 (FIG. 18), the source of light to the photocell 245 would be interrupted and hence a pulse would be provided at the outlet terminal of amplifier 247 (FIG. 27) and at the wiper arm 417.

As a result the contact 416 associated with a mold cavity aligned with the discharge station 210 will be energized so that the associated relay RL–1 will also be energized, closing its contacts 428, 424 and 429, 425. The closure of contacts 428, 424 will provide a holding circuit for relay RL–1 through the normally closed contacts 421, 422 of relay RL–2 The closure of contacts 429 and 425 will connect the positive source of potential to the associated contact 427 carried by the disc 415, thus, storing information by reason of the energization of relay RL–1 that a seed has been properly ejected.

At substantially the same time that a seed S had been ejected down the discharge tube 248, referring to FIG. 17, the disc 272 carrying the mold cavities will have rotated so that one of such mold cavities defined by the upper end of bushing 283 will be vertically aligned with the outlet end 302 of the tube 301, as shown in FIG. 17.

Prior to movement of said mold cavity to this portion which defines the mold-charging station, the mold cavity will have been advanced by the rotating disc 272 past the hopper 336 shown in FIG. 15. Before movement of said mold cavity into the chamber 348 of said hopper 336, due to the configuration of the inner cam track 256, the cam roller 298 (FIG. 17) will have been moved radially inward slightly so that the plunger 294 which has a central hemispherical depression 294' thereof in the face thereof, will be moved inwardly slightly sufficiently to receive a desired quantity of material from the chamber 348 of hopper 336 to form one of the outer layers 442 of the pellet P.

As the disc 272 rotates in a counterclockwise direction, referring to FIG. 15 (and in a clockwise direction, as shown in FIG. 20), movement of the disc 272 and the mold cavity carried thereby past the lower edge of partition 347, will level the top surface of such charge as shown in FIG. 30a. Thereupon, such cavity will move through the chamber 349 of the hopper 336. As the mold cavity moves through the chamber 349, due to the configuration of the inner cam track 256, the plunger 294 will be slightly lowered, say, about one-thirty seconds inch to the position shown in FIG. 30b to provide room to receive a relatively thin layer 445 of cushioning material from chamber 349. Thereupon, with further rotation of the disc 272, the cavity thus charged will move past the end wall 345 of the hopper 336 so that such end wall will level the second charge of material defining the layer 445, and the partially charged mold cavity will be moved to the seed-charging station 230 previously described.

With the cavity thus charged at the seed-charging station, the open end of the funnel 306 associated with such partially charged cavity will have moved under the spring-urged plate 307 which carries the end 311 of the discharge tube 248. Consequently, the seed S will be ejected from said outlet end 311, through the funnel 306 into the flexible tube 301 and through its outlet end 302 which is aligned with the center of the cavity defined by the upper end of the bushing 283, so that the seed S will be ejected onto the cushioning layer 445 as shown in FIG. 30c.

Due to the provision of the resilient feed tube 301 as shown in FIGS. 21, as the disc 272 carrying the mold cavities and the resilient tubes 301 moves by the hopper 336 which is secured to the fixed plate 252, the outer wall 334 of the hopper will cause the resilient tubes 301 to be deflected as shown in FIGS. 21 and when the disc 272 has rotated to move the charged cavity to the seed-charging station, shown in FIG. 15, the resilience of the feed tube 301 together with the force exerted by the spring-urged pusher stud 314 will locate the outlet 302 of the resilient tube 301 in proper position in shown in FIG. 17.

As previously described, it is to be noted that if a seed had been ejected through the sensing casing 241 onto the cushioning layer 445 in the semicharged cavity, the relay RL-1 shown in FIG. 27, associated with the mold cavity would have been energized so that the associated contact member 427 would have been connected to a source of positive potential and such contact member will remain energized until it subsequently performs a desired function associated with the particular cavity into which a seed had been ejected. If no seed had been ejected then of course the associated relay RL-1 would not have been energized, nor would the associated contact member 427 have been energized. This operation occurs sequentially as cavity after cavity moves to the filling station.

With further rotation of the disc 272, due to the configuration of the inner cam track 256, the plunger 294 will again be moved inwardly approximately one thirty-second inch so that as the semicharged cavity moved through the chamber 349 of the hopper 335, shown in FIGS. 15 and 20, a second layer of cushioning material 444 will be deposited into the cavity to cover the seed S as shown in FIG. 30d, and thereupon the plunger 294 will further retracted as the cavity moves through the chamber 348 of the hopper 335, the outer layer 441 will be deposited into the cavity.

At this time, due to the configuration of the lower and upper cam tracks 256, 257, the plungers will be moved toward each other. More particularly, as the roller 293 shown in FIG. 17 is moved through the cam track 257, the plunger 285 will be moved downwardly deflecting the resilient feed tube 301 and the lower end of the plunger will enter the mouth of the bushing 283 as shown in FIG. 30e. Simultaneously, with such downward movement of the upper plunger, the lower plunger 294 will move outwardly thereby compressing the four layers 440, 445, 444, 441, Due to the fact that each of the plungers 294 and 285 has a substantially hemispherical central portion and peripheral flat portions, since the distance between the peripheral flat portions of the plungers is less than the distance between the central portions of the plunger, it is apparent that there will be a greater compression of the material at the periphery of the finished pellet P than at the central portion thereof, thereby preventing excessive pressure on the delicate seed S.

Since the materials used in forming the pellet desirably have a rather high viscosity and because of the flow patterns of this rather high-viscosity material, a reinforcing ring R is formed to impart superior strength without imposing excessive force to the bulk of the pellet or causing excessive pressure to be exerted on the seed.

In addition, because of the shape of the plunger, a series of compression ratios may be established which provides a range of pressure as follows: The central portion at a ratio of 3 to 1 (from loose fill to compression) and a peripheral portion at a ratio of 6 to 1 (from loose fill to compression) and a compression ratio at the peripheral portion of 20 to 1 (from loose fill to compression).

The pellet thus formed has the seed therein protected by the layers of cushioning material 444 and 445 between which it is embedded. Furthermore, the pellet is a compacted mass of material which may readily be handled without disintegration to facilitate its subsequent handling and planting by automatic equipment.

By reason of the fact that the periphery of the pellet is relatively highly compacted, the pellet will retain substantially its integrity of shape even if the central portions thereof which are under lesser compaction should tend to disintegrate.

The pellet thus formed will be advanced by the rotation of disc 272 to the pellet discharge station 376 shown in FIGS. 1, 15, 22 to 26 inclusive.

More particularly referring to FIGS. 15 and 26, as the mold cavities are advanced to the discharge station, due to the configuration of the inner and outer cam tracks 256 and 257, the outer plunger 285 will successively be retracted and the inner plunger 294 successively extended so that when the mold cavities are moved into alignment with the resilient leaf member 341 shown in FIG. 22, such leaf member will press against the surface 341 of the hub 278 of the rotating disc 272, retaining the pellet P in the cavity from which it is being gradually expelled by the outward or extending movement of the plunger 294.

More particularly, referring to FIG. 22, when the cavity has reached the discharge position shown at X, it will be aligned with the outwardly extending inclined portion 373 of the resilient leaf member. Thus, the pellet P will be discharged onto such inclined portion as shown in FIGS. 22 and 24, the leg 374 of the resilient leaf member guiding said pellet so that it will roll down the inclined portion 373 into the mouth 384 of the distributor unit 376 shown in FIG. 25 and down the inclined floor 385 thereof.

As shown in FIGS. 22, when the cavity from which the pellet is being discharged at position X is aligned with the inclined portion 373 of the resilient leaf member, the contact member 427 shown in FIG. 27, which is associated with such cavity, will be engaged by the wiper arm 435 connected to the solenoid 394.

If a seed had properly been deposited in such cavity, the associated contact member 427 will be connected to a positive source of potential and hence the solenoid 394 will be energized extending its piston rod and pivoting the gate member 393 from the normal reject position shown in broken line in FIG. 25 to the "accept" position shown in full lines. As a result, due to the angle of inclined floor 385 and the fact that a source of vacuum is applied to the containers (not shown) connected to the discharge tubes 399 and 411, the pellet P will move down to passageway 385 and through the discharge tube 399 into the "accept" container when said container has been filled, the solenoid 408 (FIG. 23) is energized and through the linkage previously described, the gate member 402 will be pivoted from the full line position shown in FIG. 25 to the broken line position so that subsequent "accepted" pellets will then pass through discharge tube 411 into a second container.

It is apparent that if no seed had been positioned in the pellet at the discharge station, the relay RL-1 would not have been energized and hence the contact member 427 would also not have been energized. Thus, the gate member 393 shown in FIG. 25 would be in the reject position shown in broken lines whereby the pellet would be guided through the passageway 387 and discharge tube 397 into the reject container to which a source of vacuum less than that applied to the "accept" containers is also applied.

With further, rotation of the disc 272 after the pellet has been discharged and corresponding rotation of the memory disc 415, shown in FIGS. 27, the reset contact 434 associated with the associated contact 427 would engage the wiper arm 436 to connect a source of potential to the coil of reset relay RL-2.

Referring to FIG. 27a, this would cause the contacts 421 and 422 momentarily to reopen, to break the holding circuit to relay RL-1 to ready the system for the next cycle.

Naturally, if the relay RL-1 was not previously energized, energization of relay RL-2 would have no effect.

With the equipment and system above described, it is apparent that delicate seeds may be encapsulated into a pellet at a relatively high rate of speed with no manual handling being required of the seeds and with assurance that the seeds will not be injured during their encapsulation into the pellets and with an accurate selection of pellets containing a seed from those which do not contain a seed.

Having thus described my invention, what I claim as new and desire to secure by Letters Patents of the United States is:

1. Equipment for picking up individual seeds from a mass thereof, which comprises a conveyor for transporting said mass of seeds, a chamber having sidewalls and end walls, said end walls sloping toward each other to define an outlet at their lower ends, said conveyor comprising an endless belt, a pair of spaced pulleys positioned in the upper end of said chamber and extending between the sidewalls thereof, said conveyor belt encompassing said pulleys, said conveyor belt having an upper run and a lower run, means providing an arcuate path of movement of a portion of the upper run of the conveyor belt extending between said pulleys, said conveyor belt having an inlet and outlet end on opposed sides of said arcuate portion, said conveyor belt having a longitudinal groove in its outer surface between its side edges, a plurality of said pickup means, each having a pickup nozzle, means rotatably to mount said plurality of said seed pickup means for advance thereof in timed relation with the advance of said conveyor for successive movement of said plurality of nozzles into and out of the mass of seeds carried in the longitudinal groove in the arcuate portion of said conveyor belt, a seed hopper associated with said chamber, said seed hopper having an outlet aligned with the longitudinal groove in said conveyor belt for discharge of seeds into said longitudinal groove, means to apply suction to each of said nozzles while it is moving through said mass of seeds, whereby individual seeds will be picked up by each of said suction means and remaining seeds advanced by said belt will be dropped into said chamber to fall by gravity to the outlet thereof, a seed conduit having one end connected to said outlet thereof, a seed conduit having one end connected to said outlet of said chamber and the other end connected to said seed hopper for continuous recirculation of said remaining seeds and means after each of said nozzles has moved out of said mass of seeds successively to discontinue the suction applied to each nozzle and to discharge the seed carried thereby.

2. The combination set forth in claim 1 in which an inclined deflector plate is positioned in said chamber between the sidewalls thereof adjacent the outlet end of said conveyor belt and positioned above the latter, the edge of said plate providing clearance for movement of said pickup means therethrough after said pickup means have been moved out of the groove of said conveyor belt and air pressure means positioned above said plate to direct a source of air under pressure against said pickup means to remove excess seeds adhering thereto for movement of said seeds down said deflector plate into said chamber.

3. The combination set forth in claim 1 in which said chamber has a cavity at its lower end defining said outlet, said cavity extending transversely across said chamber, said seed conduit has one end connected to one end of said cavity and its other end connected to said seed hopper and means are provided to force air under pressure into the other end of said cavity whereby the seeds falling into said cavity will be blown through said conduit into said hopper.

4. The combination set forth in claim 1 in which said chamber has a block at its lower end extending transversely thereacross, said block having a transverse bore extending therethrough and a vertical slot of smaller cross-sectional width than the diameter of said bore rising vertically therefrom, said slot and associated bore defining said outlet, said seed conduit having one end connected to said hopper, and means to apply a source of air under pressure to the other end of said bore to force the seeds accumulated in said bore through said conduit into said hopper.

5. The combination set forth in claim 4 in which the top surface of said block is substantially V-shaped in cross section defining a pair of inclined sidewalls leading into said slot, the lower edges of the end walls of said chamber being connected to said block to define a substantially continuous surface together with the sidewalls of the top surface of said block.

6. The combination set forth in claim 4 which an air nozzle is provided extending through one of the sidewalls of said chamber having its outlet end directed toward said slot to force the seeds accumulating at the lower end of said chamber through said slot into transverse bore.

7. The combination set forth in claim 4 in which an air nozzle is provided extending through one of the sidewalls of said chamber having its outlet end directed toward said slot to force the seeds accumulating at the lower end of said chamber through said slot into said transverse bore, and baffle means are provided extending transversely across said chamber and positioned over said nozzle to restrict upward movement of the seeds.

8. The combination set forth in claim 4 in which a plurality of air nozzles of different lengths extend into said transverse bore and means are provided to apply air under pressure to said air nozzles for movement of the seeds from said bore into said conduit.

9. The combination set forth in claim 1 in which an air nozzle leads into said conduit to enhance the movement of the seeds therethrough, when air under pressure is applied to said air nozzle.

10. The combination set forth in claim 1 in which a feed funnel is provided at the end of said chamber remote from the end thereof mounting said said seed hopper, whereby said chamber may be initially charged with a mass of seeds.

11. An equipment for picking up individual seeds from a mass of such seeds comprising an endless conveyor belt, a pair of spaced pulleys each rotatable on a horizontal axis, said conveyor belt encompassing said pulleys means to drive at least one of said pulleys to advance said conveyor belt, said conveyor belt having an upper and lower run, means to provide movement of at least a portion of the upper arm run of said conveyor belt extending between said pulleys in an arcuate path, said conveyor belt having an inlet end and an outlet end on opposed ends of said arcuated portion, means to deposit a mass of seeds on said conveyor belt at the inlet end thereof, a pickup device rotatably mounted on an axis extending transversely with respect to the path of movement of said conveyor belt, said pickup device having a plurality of pickup members extending radially outward therefrom and equidistantly spaced around the circumference of said pickup device, each of said pickup members comprising a hollow tube extending substantially radially outward from said pickup device, each of said tubes having a finger at the outer end thereof, said fingers extending at substantially right angles to the tubes and being movable through the mass of seeds carried by at least the arcuate portion of said conveyor belt as said pickup member is rotated, each of said fingers having a pickup nozzle at its free end adapted to abut against such mass of seeds, means to apply suction through said tubes and said nozzles at least while said nozzles are moved through the mass of seeds carried by the arcuate portion of said conveyor belt, thereby to pick up a single seed with each of said nozzles, and means after said nozzles have moved away from the arcuate portion of said conveyor belt successively to discontinue the application of suction to said nozzles and apply pressure thereto for successive discharge of said seeds.

12. The combination set forth in claim 11 in which a hollow shaft is provided, means securely to retain said hollow shaft in fixed position extending transversely across said conveyor belt, said shaft defining the axis of said pickup device, a pair of cylindrical chambers each of greater dimension than said shaft and encompassing the latter, said chambers, being longitudinally spaced with respect to said shaft and in sealing engagement therewith, rotary bearings associated with said chambers and encompassing said shaft, means to rotate said chambers in unison, means providing a source of air under pressure into one of said chambers, means providing a source of suction to the other of said chambers, a plurality of valve means corresponding in number to the plurality of pickup members, means mounting said valve means for movement in unison with said chambers, each of said valve means having a gas pressure inlet port connected to said suction chamber and an outlet port to which an associated pickup member is connected, each of said valve means having a movable valve member normally connecting the suction port thereof to said outlet port and means controlled by the rotation of said pickup member successively to actuate said movable valve means to disconnect the suction port from said outlet port to connect said pressure port to said outlet port.

13. The combination set forth in claim 12 in which a pair of sleeves are provided each of greater dimension than said hollow shaft and encompassing the latter, said sleeves being longitudinally spaced on said shaft, the annular cavity defined between said sleeve and said shaft forming said suction chamber and said pressure chamber, each of said sleeves having an end plug in each end thereof through said hollow shaft extends, sealing means carried by each of said end plugs and engaging the shaft to effect said sealing engagement of said chamber with said shaft, a pair of spaced parallel plates positioned between the adjacent inner ends of said sleeves and rigid therewith, said valve means each comprising a block extending transversely between said plates and secured thereto, said valve blocks being circumferentially arranged in equally spaced relation to define an annulus of greater diameter than said sleeves, said outlet port of each of said valve extending radially outward from said block and said movable valve members extending radially inward from each of said blocks, means rotatably to mount said sleeves and said plates on said shaft, means to rotate said sleeves and said plates on a fixed abutment member in the path of movement of said inwardly extending movable valve members successively to be engaged thereby to actuate the associated valve.

14. The combination set forth in claim 13 in which said fixed abutment member comprises an arm rigidly secured to said hollow shaft and extending outwardly therefrom, said arm having abutment means at its free end in the path of movement of the inwardly extending movable valve member.

15. The combination set forth in claim 13 in which said abutment means comprises a roller rotatably mounted at the end of said arm.

16. The combination set forth in claim 12 in which a discharge tube is provided arcuately displaced from the position where said pickup nozzles move out of the mass of seeds carried by said conveyor belt, said discharge tube having an inlet, said pickup nozzles being successively movable into juxtaposition to the inlet of said discharge tube and the means successively to actuate said valve means comprises an abutment member mounted in fixed position in the path of movement, of the inwardly extending control members of said valve means, said abutment member being positioned to actuate an associated valve member when the pickup nozzle associated with said valve member is in juxtaposition to the inlet of said discharge tube, whereby the suction to said nozzle will be cut off and pressure will be applied thereto to discharge the seed carried by said nozzle into said discharge tube.

17. The combination set forth in claim 16 in which said discharge tube has a vertical slot in the wall into and out of which said nozzles will successively pass during the arcuate movement thereof.

18. As an article of manufacture, a discharge nozzle for seeds, comprising a tube having an axial bore therethrough and having frustoconical outer surface through which said bore extends, said surface tapering inwardly toward said bore, a flexible diaphragm secured to the outer surface of said nozzle and having a central opening axially aligned with said bore and of diameter when unstretched slightly less than the diameter of the seed, the portion of said diaphragm adjacent the periphery of said bore.

19. The combination set forth in claim 18 in which the outer portion of said bore is of enlarged diameter greater than that of said seed.

* * * * *